A DP QPSK optical modulator includes an input port; an optical branching unit; an optical modulation unit having first through fourth Mach-Zehnder interferometers; a first phase-change unit connected to the third Mach-Zehnder interferometer; a second phase-change unit connected to the fourth Mach-Zehnder interferometer; an optical multiplexer; and a multimode interference coupler including a multimode interference waveguide, first through third input ports, and an output port having a taper-shaped waveguide. The first Mach-Zehnder interferometer is connected to the first input port. One end of the optical multiplexer is connected to the second Mach-Zehnder interferometer and the third Mach-Zehnder interferometer via the first phase change unit. The other end of the optical multiplexer is connected to the second input port. The fourth Mach-Zehnder interferometer is connected to the third input port via the second phase-change unit.

US 8,718,412 B2

United States Patent
Onishi

(10) Patent No.: US 8,718,412 B2
(45) Date of Patent: May 6, 2014

(54) DUAL POLARIZATION QUADRATURE PHASE SHIFT KEYING OPTICAL MODULATOR

(71) Applicant: Sumitomo Electric Industries, Ltd., Osaka (JP)

(72) Inventor: Yutaka Onishi, Yamato (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/765,765

(22) Filed: Feb. 13, 2013

(65) Prior Publication Data

US 2013/0216175 A1 Aug. 22, 2013

(30) Foreign Application Priority Data

Feb. 21, 2012 (JP) ................. 2012-035306

(51) Int. Cl.
*G02F 1/01* (2006.01)
(52) U.S. Cl.
USPC ................................................................ 385/1
(58) Field of Classification Search
USPC ..................................................... 385/1, 2, 9
See application file for complete search history.

(56) References Cited

PUBLICATIONS

Hiroshi Yamazaki, et al., "Integrated 100-Gb/s PDM-QPSK modulator using a hybrid assembly technique with silica-based PLCs and LiNbO$_3$ phase modulators", ECOC 2008, IEEE, 2008, vol. 1, pp. 17-20.

*Primary Examiner* — Ryan Lepisto
*Assistant Examiner* — Erin Chiem
(74) *Attorney, Agent, or Firm* — Smith, Gambrell & Russell, LLP

(57) ABSTRACT

9 Claims, 13 Drawing Sheets

DUAL POLARIZATION QUADRATURE PHASE SHIFT KEYING OPTICAL MODULATOR

BACKGROUND OF THE INVENTION

1. Field of the Invention

The present invention relates to a Dual Polarization Quadrature Phase Shift Keying (DP QPSK) optical modulator.

2. Description of the Related Art

It is required to increase speed and capacity of optical transmission systems, to handle increased communication amount (traffic). Employing coherent communications capable of greater transmission amount comparing with conventional intensity-modulated communications (on off keying) is studied. Of coherent communications, phase key shifting is gathering attention in particular. Of phase shift keying, there is a format called Dual Polarization Quadrature Phase Shift Keying (hereinafter may be referred to as DP QPSK), in which two quadrature phase shift keying (hereinafter may be referred to as "QPSK") signals are transmitted, carried by two orthogonal polarized lights, respectively. QPSK is researched as a format whereby high-speed and large-capacity optical transmission systems can be realized.

Described in Hiroshi Yamazaki et. al., "Integrated 100-Gb/s PDM-QPSK modulator using a hybrid assembly technique with silica-based PLCs and LiNbO$_3$ phase modulators", ECOC 2008, IEEE, 2008, Vol. 1, pp. 17-20, is a DP QPSK optical modulator used in DP QPSK optical transmission systems. The technology described in this literature uses hybrid integration technology to integrate two QPSK optical modulators and polarization beam combiners, thereby forming a DP QPSK optical modulator.

SUMMARY OF THE INVENTION

FIG. 1 illustrates a schematic plan view of a conventional DP QPSK optical modulator such as described in the above literature. As illustrated in FIG. 1, a conventional DP QPSK optical modulator LMP includes an optical branching unit 100, an optical modulation unit 300, and an optical operation unit 500. The optical modulation unit 300 includes first through fourth Mach-Zehnder interferometers 301, 302, 303, and 304. The optical operation unit 500 includes $\pi/2$ phase shifters 501 and 502, a polarization rotator 503, and a polarization beam mixer 505.

TE polarized waves TE of continuous light are input to a waveguide 101 of the optical branching unit 100. The waveguide 101 acts to split the TE polarized waves TE input thereto into four TE polarized waves. Specifically, the TE polarized waves TE are split by optical branching units 103, 105, and 107, to four TE polarized wave components Ixp, Qxp, Iyp, and Qyp, guided through four waveguides 111, 112, 113, and 114. The four TE polarized wave components Ixp, Qxp, Iyp, and Qyp are each input to the first through fourth Mach-Zehnder interferometers 301, 302, 303, and 304, of the optical modulation unit 300, and after bing modulated by the first through fourth Mach-Zehnder interferometers 301, 302, 303, and 304, are input to the optical operation unit 500.

The TE polarized wave component Qxp has the phase thereof shifted $\pi/2$ by the $\pi/2$ phase shifter 501 of the optical operation unit 500. Accordingly, the phase difference between the TE polarized wave component Ixp and the TE polarized wave component Qxp is 90 degrees. Subsequently, the TE polarized wave component Ixp and the TE polarized wave component Qxp are optically coupled at an optical multiplexer 507, thereby forming TE polarized wave component TExp.

The TE polarized wave component Qyp has the phase thereof shifted $\pi/2$ by the $\pi/2$ phase shifter 502 of the optical operation unit 500. Accordingly, the phase difference between the TE polarized wave component Iyp and the TE polarized wave component Qyp is 90 degrees. Subsequently, the TE polarized wave component Iyp and the TE polarized wave component Qyp are optically coupled at an optical multiplexer 508, thereby forming TE polarized wave component TEyp. The TE polarized wave component TEyp has the polarization plane thereof rotated 90 degrees by the polarization rotator 503, and becomes coupled TM polarized wave component TMyp. Accordingly, the polarization plane of the TE polarized wave component TExp and the polarization plane of the TE polarized wave component TEyp orthogonally intersect.

The TE polarized wave component TExp and the coupled TM polarized wave component TMyp then are optically coupled at the polarization beam mixer 505, thereby forming generating DP QPSK signal light MS, which is an orthogonal dual polarization wave. This DP QPSK signal light MS is then externally output from the DP QPSK optical modulator LMP.

However, with the conventional DP QPSK optical modulator LMP, four optical operations are performed at the DP QPSK optical modulator LMP to obtain the DP QPSK signal light MS, which are the TE polarized wave component Ixp and the TE polarized wave component Qxp being optically coupled, the TE polarized wave component Iyp and the TE polarized wave component Qyp being optically coupled, polarization rotation of the TE polarized wave component TEyp, and polarization combining of the TE polarized wave component TExp and the coupled TM polarized wave component TMyp at the optical operation unit 500. Accordingly, at least four optical elements (optical multiplexer 507, optical multiplexer 508, polarization rotator 503, and polarization beam mixer 505) have to be used.

When performing such four optical operations, optical loss occurs in at least the above four optical elements. As a result, the optical loss in the DP QPSK optical modulator LMP is increased.

A DP QPSK optical modulator according to the present invention includes: an input port; an optical branching unit branching linearly-polarized light received from the input port into first through fourth linearly-polarized light components; an optical modulation unit connected to the optical branching unit, the optical modulation unit having first through fourth Mach-Zehnder interferometers that modulate the first through fourth linearly-polarized light components; a first phase-change unit connected to the third Mach-Zehnder interferometer, the first phase-change unit changing a phase of the third linearly-polarized light component; a second phase-change unit connected to the fourth Mach-Zehnder interferometer, the second phase-change unit changing a phase of the fourth linearly-polarized light component; an optical multiplexer coupling the second linearly-polarized light component and third linearly-polarized light component; and a multimode interference coupler including a multimode interference waveguide, first through third input ports extending in an optical waveguide direction, and an output port having a taper-shaped waveguide, the first through third input ports being provided along a direction orthogonal to the optical waveguide direction, the second input port being provided between the first input port and the third input port. The first Mach-Zehnder interferometer is connected to the first input port of the multimode interference coupler. One end of the optical multiplexer is connected to the second Mach-Zehnder interferometer and the third Mach-Zehnder interferometer via the first phase change unit. The other end of the optical multiplexer is connected to the second input port of the multimode interference coupler. In addition, the fourth Mach-Zehnder interferometer is connected to the third input port of the multimode interference coupler via the second phase-change unit.

With the DP QPSK optical modulator configured as described above, the second linearly-polarized wave component and the third linearly-polarized wave component are optically coupled by the optical multiplexing unit. Also, the first linearly-polarized wave component, the linearly-polarized wave component optically coupled by the optical multiplexing unit (fifth linearly-polarized wave component), and the fourth linearly-polarized wave component are optically coupled, and output to the output port as a coupled linearly-polarized light by the multimode interference coupler. In addition, the output port includes a taper-shaped waveguide. Accordingly, a part (sixth linearly-polarized wave component) of the coupled linearly-polarized light output from the multimode interference waveguide to the output port is guided through the output port, whereby the plane of polarization is rotated by a predetermined angle. Thus, the four optical operations of optical coupling (multiplexing) of the second linearly-polarized wave component and the third linearly-polarized wave component, optical coupling (multiplexing) of the first linearly-polarized wave component and the fourth linearly-polarized wave component, polarization rotating of the sixth linearly-polarized wave component, and optical coupling (multiplexing) of the fifth linearly-polarized wave component and the sixth linearly-polarized wave component, in order to obtain DP QPSK signal light, can be performed with two optical elements (the optical multiplexing unit and multimode interference coupler). Therefore, number of optical elements in the DP QPSK modulator which have an optical loss is reduced. As a result, an optical loss of the DP QPSK modulator can be reduced.

In the DP QPSK optical modulator according to the present invention, preferably, the taper-shaped waveguide of the output port has a width that gradually decreases along the optical waveguide direction as the taper-shaped waveguide is away from the multimode interference waveguide.

In the DP QPSK optical modulator according to the present invention, the multimode interference waveguide may include a linear first outer edge in contact with the first through third input ports, a second outer edge facing the first outer edge and in contact with the output port, and third and fourth outer edges in contact with the first outer edge and the second outer edge. The first input port may be connected to one edge of the first outer edge of the multimode interference waveguide, the first input port having an outer edge steplessly connected to the third outer edge of the multimode interference waveguide. In addition, the third input port may be connected to the other edge of the first outer edge of the multimode interference waveguide, the third input port having an outer edge steplessly connected to the fourth outer edge of the multimode interference waveguide.

Accordingly, the first input port and third input port, and the multimode interference waveguide are in direct contact, so an optical loss at the interface thereof can be reduced. Further, in the multimode interference waveguide, the first linearly-polarized wave component and the fourth linearly-polarized wave component are optically coupled and converted to first-order mode, as a sixth linearly-polarized wave component. At this time, the number of points at which the first-order mode sixth linearly-polarized wave component is imaged within the multimode interference waveguide is reduced, so the optical coupling efficiency of the first linearly-polarized wave component and fourth linearly-polarized wave component and conversion efficiency to first-order mode can be improved. As a result, the optical loss of the DP QPSK modulator can be further reduced.

In the DP QPSK optical modulator according to the present invention, the first phase change unit preferably changes the phase of the third linearly-polarized wave component by approximately $\pi/2$. The second phase change unit preferably changes the phase of the fourth linearly-polarized wave component by approximately $\pi/2$. Accordingly, the phase of the second linearly-polarized wave component immediately before input to the optical multiplexer, and the phase of the third linearly-polarized wave component immediately before input to the optical multiplexer, can be made to be generally orthogonal. In addition, the phase of the first linearly-polarized wave component immediately before input to the first input port, and the phase of the fourth linearly-polarized wave component immediately before input to the third input port, can be made to be generally orthogonal. This enables generating of DP QPSK signal light which is robust with regard to noise.

In the DP QPSK optical modulator according to the present invention, the optical multiplexer coupling the second linearly-polarized wave component and the third linearly-polarized wave component preferably outputs a fifth linearly-polarized wave component to the second input port. In addition, the multimode interference coupler preferably couples the first linearly-polarized wave component input to the first input port, the fifth linearly-polarized wave component input to the second input port, and the fourth linearly-polarized wave component input to the third input port within the multimode interference waveguide and outputs a coupled linearly-polarized light to the output port, the first linearly-polarized wave component and the fourth linearly-polarized wave component being converted to first-order mode and output to the output port as a sixth linearly-polarized wave component.

In the DP QPSK optical modulator according to the present invention, the multimode interference waveguide of the multimode interference coupler may be a polarization maintaining waveguide in which polarization states of the first, fourth, and fifth linearly-polarized wave components are maintained.

In the DP QPSK optical modulator according to the present invention, the output port of the multimode interference coupler preferably converts a propagation mode of the sixth linearly-polarized wave component from the first-order mode to a fundamental mode and preferably rotates a plane of polarization of the sixth linearly-polarized wave component.

In the DP QPSK optical modulator according to the present invention, the output port may be configured such that degeneration of the sixth linearly-polarized wave component does not occur in converting from the first-order mode to the fundamental mode and rotating the plane of polarization of the sixth linearly-polarized wave component. Accordingly, conversion efficiency to the fundamental mode at the time of guiding the sixth linearly-polarized wave component through the output port can be improved.

In the DP QPSK optical modulator according to the present invention, the first input port and the third input port may be a single-mode optical waveguide. The first input port cuts off the first linearly-polarized wave component of the first-order mode. The third input port cuts off the fourth linearly-polarized wave component of the first-order mode. Accordingly, just the first linearly-polarized wave component of the fundamental mode can be guided through the first input port.

Also, just the fourth linearly-polarized wave component of the fundamental mode can be guided through the third input port. Accordingly, the optical coupling efficiency of the first linearly-polarized wave component and fourth linearly-polarized wave component and conversion efficiency to first-order mode can be improved. As a result, the optical loss of the DP QPSK modulator can be further reduced.

DESCRIPTION OF THE PREFERRED EMBODIMENTS

Figure 1:
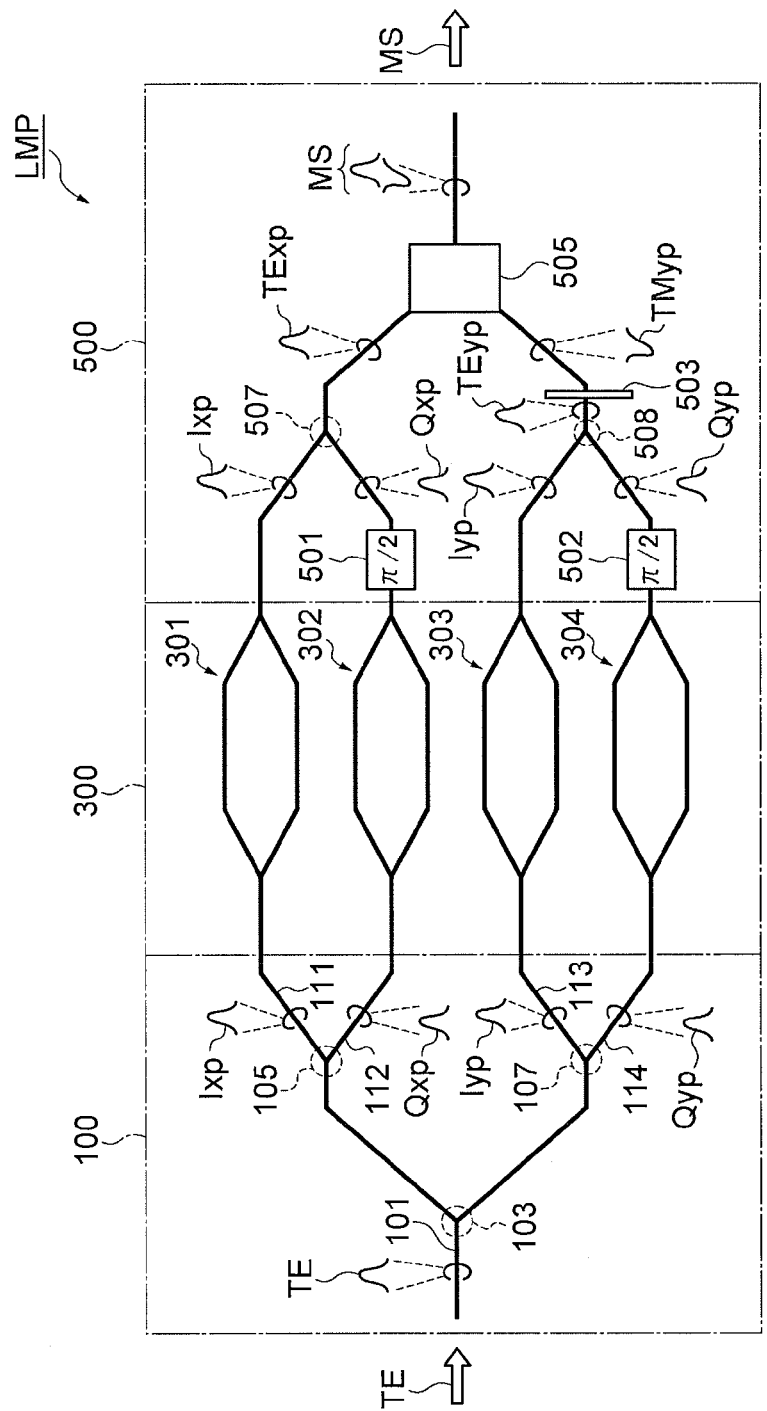
FIG. 1 is a schematic plan view illustrating the configuration of a conventional DP QPSK optical modulator.

A Dual Polarization Quadrature Phase Shift Keying (DP QPSK) optical modulator according to an embodiment will be described with reference to the attached drawings. Note that in the drawings, the same components are denoted with the same reference numerals wherever reasonably possible. Also note that the scale and dimensions within and between the components are arbitrary, to facilitate comprehension of the drawings.

Figure 2:
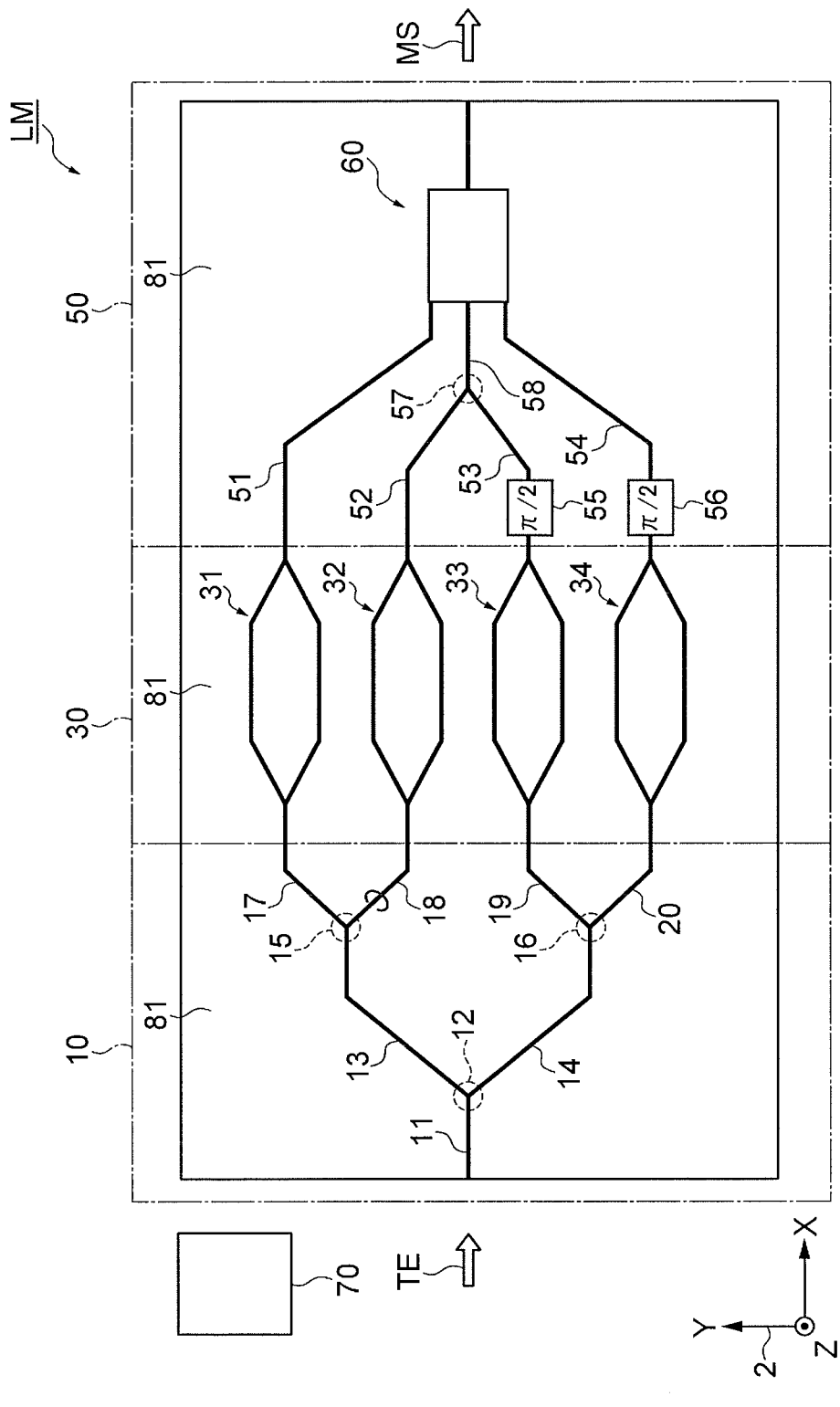
FIG. 2 is a schematic plan view illustrating the configuration of a DP QPSK optical modulator according to an embodiment.

FIG. 2 is a schematic plan view illustrating the configuration of a DP QPSK optical modulator according to the present embodiment. As illustrated in FIG. 2, the DP QPSK optical modulator LM according to the present embodiment includes an optical branching unit 10, an optical modulating unit 30, an optical operating unit 50, a control unit 70, and a substrate 81. The optical branching unit 10, optical modulating unit 30, and an optical operation unit 50 are formed on the principal face of the substrate 81. In FIG. 2 and other drawings, an orthogonal coordinates system 2 is illustrated, with an X axis and Y axis set parallel to the principal face of the substrate 81, and a Z axis set orthogonal to the principal face.

The optical branching unit 10 receives linearly-polarized light to be modulated. With the present embodiment, the linearly-polarized light to be modulated is Transverse Electric (TE) polarization waves TE. With the present embodiment, the optical branching unit 10 has optical waveguides 11, 13, 14, 17, 18, 19, and 20, and optical branching units 12, 15, and 16. The optical modulating unit 30 has first through fourth Mach-Zehnder interferometers 31, 32, 33, and 34. The optical operation unit 50 according to the present embodiment includes optical waveguides 51, 52, 54, and 58, a first phase-change unit 55, a second phase-change unit 56, an optical multiplexer 57, and a multimode interference coupler 60. The optical operation unit 50 externally emits DP QPSK signal light MS. Hereinafter, the functions of the DP QPSK optical modulator LM will be described while describing the detailed configurations of the optical branching unit 10, optical modulating unit 30, optical operation unit 50, and control unit 70.

Optical Branching Unit

Figure 3:
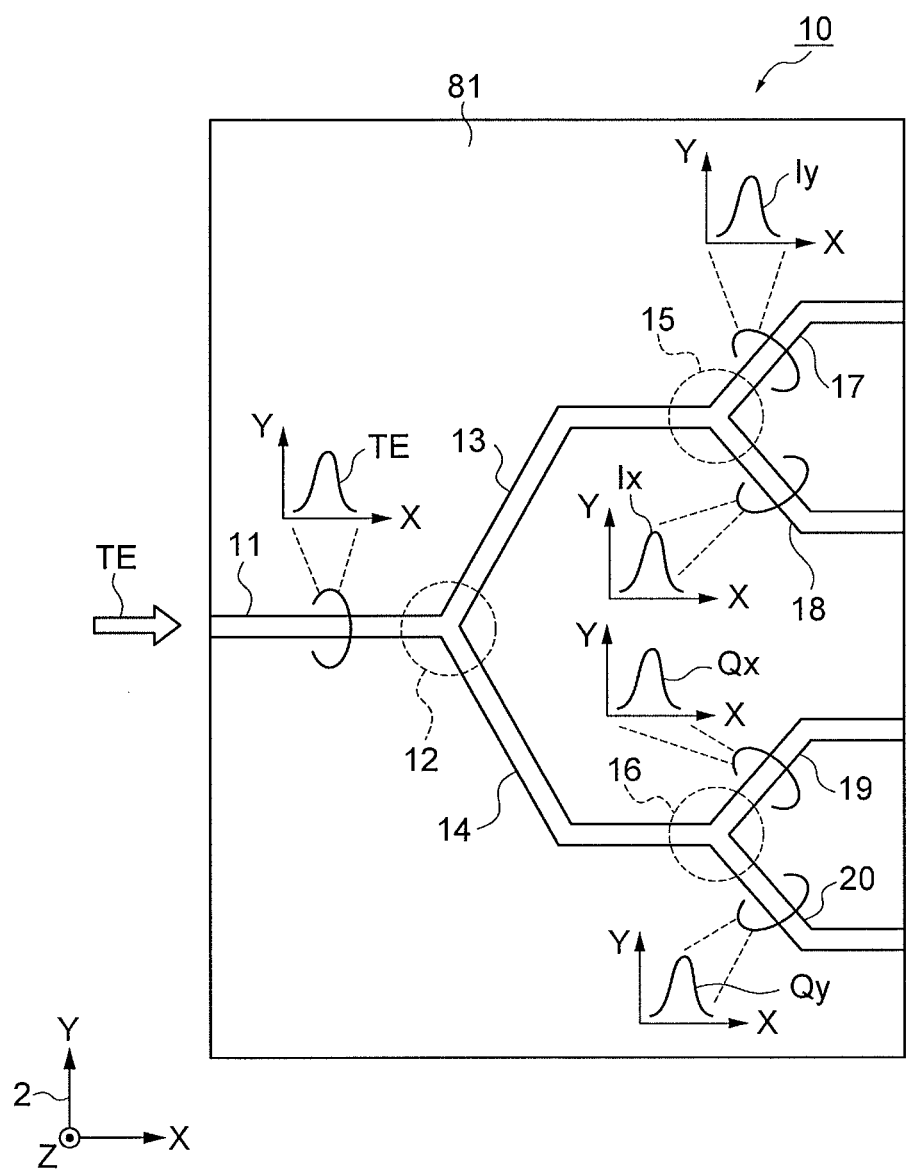
FIG. 3 is a schematic plan view illustrating the configuration of an optical branching unit.

FIG. 3 is a schematic plan view illustrating the configuration of the optical branching unit 10. As illustrated in FIG. 3, TE polarization waves TE are input to the optical waveguide 11. The optical branching unit 10 functions to branch the received linearly-polarized light to be modulated into four linearly-polarized wave components having the same polarization state.

Specifically, the optical waveguide 11 branches into the optical waveguide 13 and optical waveguide 14 at the optical branching unit 12. The optical waveguide 13 branches into the optical waveguide 17 and optical waveguide 18 at the optical branching unit 15. Also, the optical waveguide 14 branches into the optical waveguide 19 and optical waveguide 20 at the optical branching unit 16. The optical waveguides 11, 13, 14, 17, 18, 19, and 20 each function to guide the light in the direction following the XY plane. With the present embodiment, the optical waveguides 11, 13, 14, 17, 18, 19, and 20 are planar lightwave circuits (PLCs) of which the thickness dimensions are in the Z-axial direction. The optical branching unit 12, optical branching unit 15, and optical branching unit 16 are, for example, Y-branch optical waveguides such as Y-branch planar lightwave circuits. Note that with the plan view illustrated in FIG. 3, for the components having functions as an optical waveguide or lightwave circuit (e.g., optical branching unit) have the members thereof stipulating the optical waveguide or optical waveguide direction (described later in detail) illustrated using solid lines, and illustration of other members is omitted. This is also true for the other drawings, unless stated otherwise.

Figure 4A:
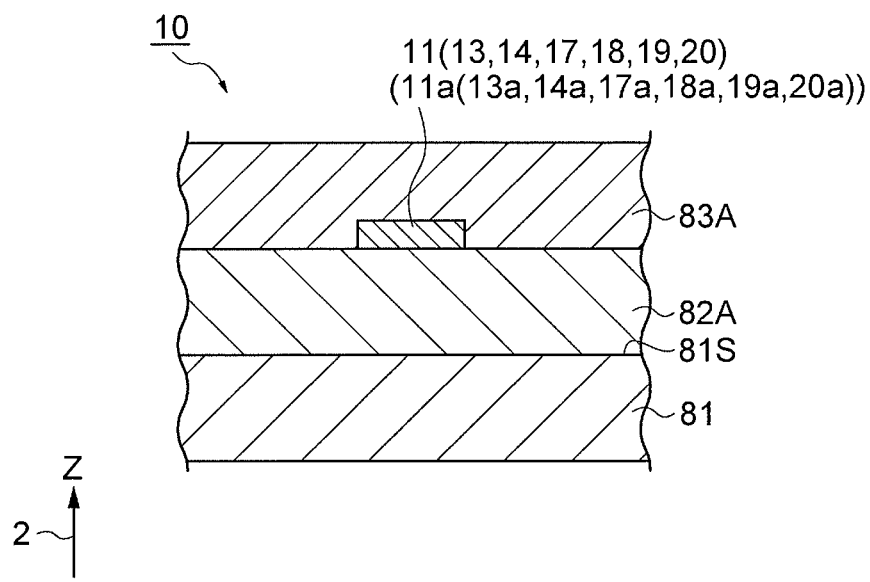
FIGS. 4A and 4B are diagrams illustrating examples of cross-sectional views of an optical branching unit.

FIG. 4A is a diagram illustrating an example of the cross-section of an optical branching unit. FIG. 4A illustrates the cross-section of the optical branching unit 10, which has been taken along a plane which intersects the optical waveguide 11 (13, 14, 17, 18, 19, 20), and also is orthogonal to the optical waveguide direction of the optical waveguide 11 (13, 14, 17, 18, 19, 20).

As illustrated in FIG. 4A, the optical waveguide 11 (13, 14, 17, 18, 19, 20) according to this example is a so-called buried optical waveguide. The substrate 81 is formed of a single element semiconductor material such as silicon (Si) or the like. The optical branching unit 10 is formed on a principal surface 81S of the substrate 81. The principal surface 81S is a flat surface of the substrate 81, extending along the XY plane. The optical branching unit 10 has a lower cladding region 82A formed on the principal surface 81S of the substrate 81, a core region 11a (13a, 14a, 17a, 18a, 19a, 20a) formed on the lower cladding region 82A, and an upper cladding region 83A formed upon the lower cladding region 82A and core region 11a (13a, 14a, 17a, 18a, 19a, 20a), such that the core region 11a (13a, 14a, 17a, 18a, 19a, 20a) is embedded. The core region 11a (13a, 14a, 17a, 18a, 19a, 20a) is formed of a single element semiconductor material such as silicon (Si) or the like, and the cross-sectional form thereof is rectangular.

The lower cladding region 82A and upper cladding region 83A are formed of a compound including the same material as that constituting the substrate 81 (e.g., a silicon compound). As an example, the lower cladding region 82A is formed of silicon oxide ($SiO_2$), and the upper cladding region 83A is formed of silicon nitride (SiN).

With the buried optical waveguide according to this example, the core region 11a (13a, 14a, 17a, 18a, 19a, 20a) stipulates the optical waveguide and optical waveguide direction of the optical waveguide 11 (13, 14, 17, 18, 19, 20). Accordingly, with the present example, the shape of the core region 11a (13a, 14a, 17a, 18a, 19a, 20a) corresponds to the shape of the optical waveguide 11 (13, 14, 17, 18, 19, 20) illustrated with solid lines in FIG. 3.

The thickness dimension of the lower cladding region 82A in the Z-axial direction is, for example, 2 μm. The width of the core region 11a (13a, 14a, 17a, 18a, 19a, 20a) in the direction orthogonal to the optical waveguide direction (the horizontal direction in FIG. 4A) is, for example, 500 nm. Also, the thickness dimension of the core region 11a (13a, 14a, 17a, 18a, 19a, 20a) in the Z-axial direction is, for example, 220 nm. The thickness dimensions of the upper cladding region 83A in the Z-axial direction at the region in direct contact with the lower cladding region 82A is, for example, 2 μm.

Figure 4B:
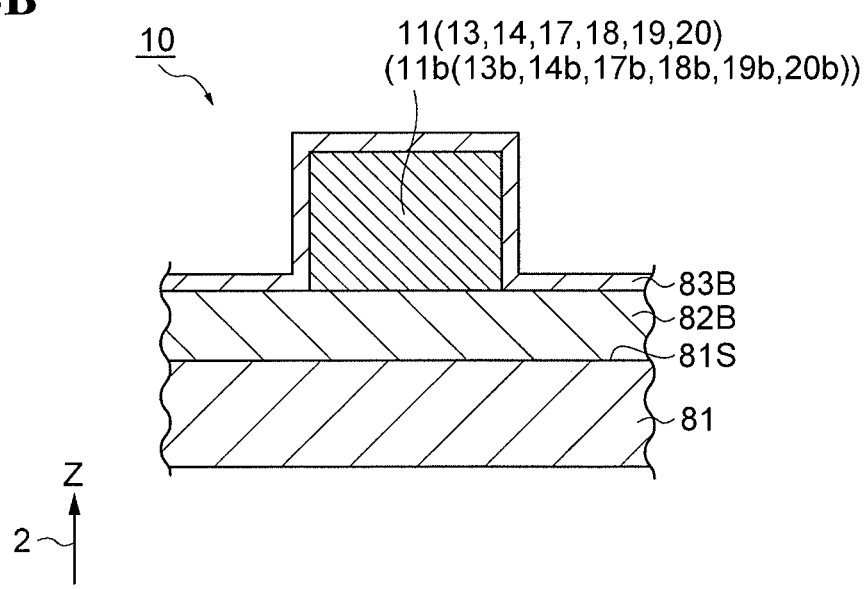

FIG. 4B is a diagram illustrating another example of a cross-section of the optical branching unit. FIG. 4B illustrates a cross-section of the optical branching unit 10 taken along a plane which intersects the optical waveguide 11 (13, 14, 17, 18, 19, 20), and also is orthogonal to the optical waveguide direction of the optical waveguide 11 (13, 14, 17, 18, 19, 20).

As illustrated in FIG. 4B, the optical waveguide 11 (13, 14, 17, 18, 19, 20) according to this example is a so-called ridge waveguide. The substrate 81 is formed of a III-V group compound semiconductor such as indium phosphide (InP) or the like. Also, the optical branching unit 10 is formed on the principal surface 81S of the substrate 81. The optical branching unit 10 has a core region 82B formed on the principal surface 81S, an upper cladding region 11b (13b, 14b, 17b, 18b, 19b, 20b) formed on the core region 82B, and a protective film 83B formed conformally on the core region 82B and upper cladding region 11b (13b, 14b, 17b, 18b, 19b, 20b) so as to cover these. With this example, the substrate 81 functions as a lower cladding region as to the core region 82B. The upper cladding region 11b (13b, 14b, 17b, 18b, 19b, 20b) formed on the core region 82B has a ridge structure. The upper cladding region 11b (13b, 14b, 17b, 18b, 19b, 20b) is formed of a III-V group compound semiconductor such as InP or the like, with a rectangular cross-sectional form.

The core region 82B is formed of a III-V group compound semiconductor such as gallium indium arsenide phosphide (GaInAsP) or the like. The protective film 83B is formed of a dielectric material such as silicon oxide ($SiO_2$) or silicon nitride (SiN).

With the ridge waveguide according to this example, the upper cladding region 11b (13b, 14b, 17b, 18b, 19b, 20b) stipulates the optical waveguide and optical waveguide direction of the optical waveguide 11 (13, 14, 17, 18, 19, 20). Accordingly, with the present example, the shape of the upper cladding region 11b (13b, 14b, 17b, 18b, 19b, 20b) corresponds to the shape of the optical waveguide 11 (13, 14, 17, 18, 19, 20) illustrated with solid lines in FIG. 3.

The thickness dimension of the core region 82B in the Z-axial direction is, for example, 500 nm. The width of the upper cladding region 11b (13b, 14b, 17b, 18b, 19b, 20b) in the direction orthogonal to the optical waveguide direction (the horizontal direction in FIG. 4B) is, for example, 2.5 μm, and the thickness dimension of the upper cladding region 11b (13b, 14b, 17b, 18b, 19b, 20b) in the Z-axial direction is, for example, 950 nm. The thickness dimensions of the protective film 83B are, for example, 500 nm.

Also, as illustrated in FIG. 3, the TE polarized waves TE input to the optical waveguide 11 of the optical branching unit 10 is branched to two TE polarized wave components guided through the optical waveguide 13 and optical waveguide 14 by the optical branching unit 12. Further, the TE polarized wave component guided through the optical waveguide 13 is branched to a first TE polarized wave component Iy serving as a first linearly-polarized component guided through the optical waveguide 17 and a second TE polarized wave component Ix serving as a second linearly-polarized component guided through the optical waveguide 18, by the optical branching unit 15. Also, the TE polarized wave component guided through the optical waveguide 14 is branched to a third TE polarized wave component Qy serving as a third linearly-polarized component guided through the optical waveguide 19 and a fourth TE polarized wave component Qx serving as a fourth linearly-polarized component guided through the optical waveguide 20, by the optical branching unit 16.

Optical Modulating Unit and Control Unit

Figure 5:
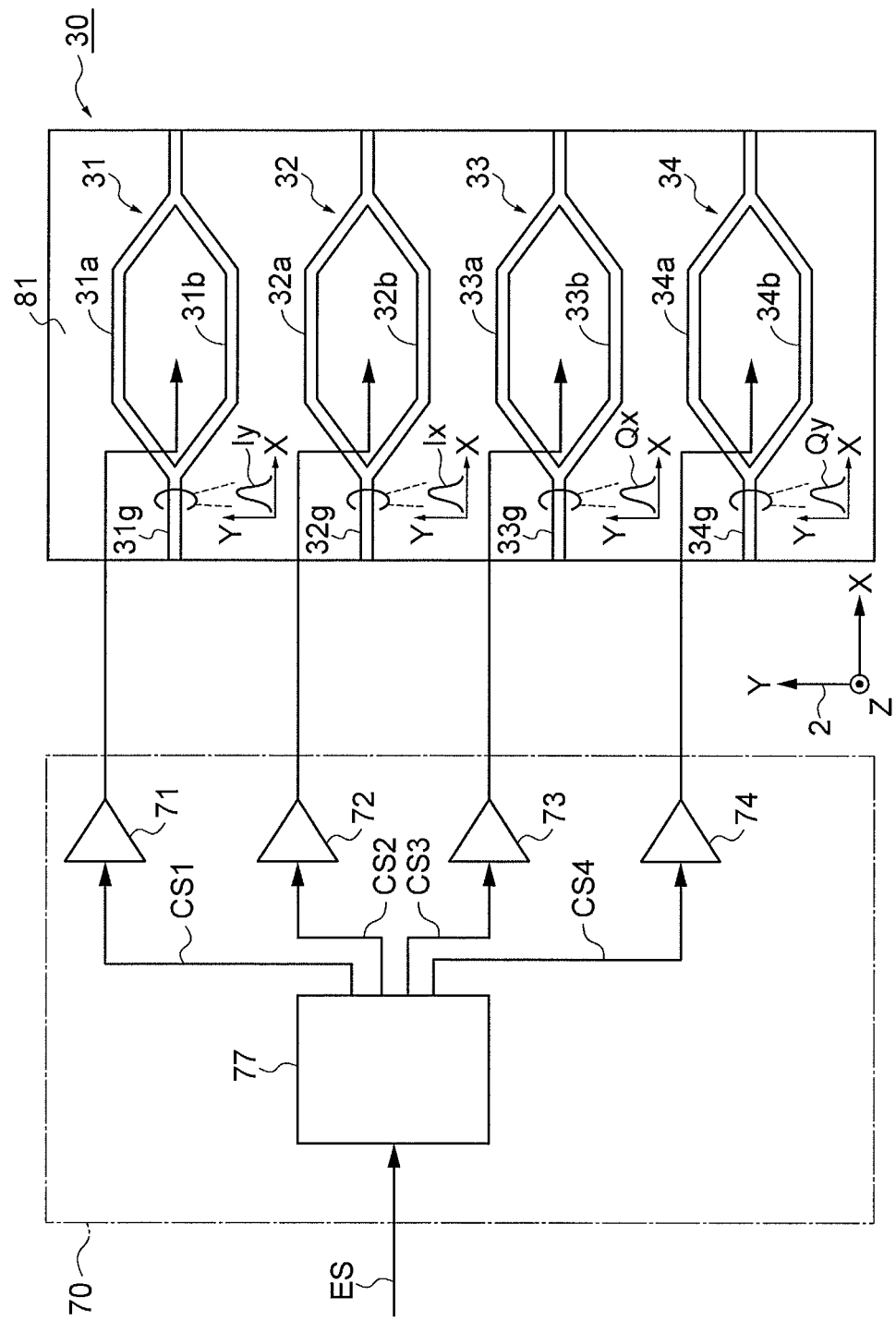
FIG. 5 is a schematic plan view illustrating the configuration of an optical modulation unit and control unit.

FIG. 5 is a schematic plan view illustrating the configuration of an optical modulating unit and control unit. As illustrated in FIG. 5, the optical modulating unit 30 is configured of a first Mach-Zehnder interferometer 31, a second Mach-Zehnder interferometer 32, a third Mach-Zehnder interferometer 33, and a fourth Mach-Zehnder interferometer 34.

The first Mach-Zehnder interferometer 31 has a Mach-Zehnder type optical waveguide 31g optically connected to the optical waveguide 17 (see FIGS. 2 and 3) of the optical branching unit 10. In the same way, the second Mach-Zehnder interferometer 32 has a Mach-Zehnder type optical waveguide 32g optically connected to the optical waveguide 18 (see FIGS. 2 and 3) of the optical branching unit 10. The third Mach-Zehnder interferometer 33 has a Mach-Zehnder type optical waveguide 33g optically connected to the optical waveguide 19 (see FIGS. 2 and 3) of the optical branching unit 10. Also, the fourth Mach-Zehnder interferometer 34 has a Mach-Zehnder type optical waveguide 34g optically connected to the optical waveguide 20 (see FIGS. 2 and 3) of the optical branching unit 10.

The Mach-Zehnder type optical waveguides 31g, 32g, 33g, and 34g are each optical waveguides for guiding light in the direction along the XY plane. With the present embodiment, the Mach-Zehnder type optical waveguides 31g, 32g, 33g, and 34g are planar lightwave circuits (PLCs) having the direction following the Z axis as the thickness direction thereof.

Also, the middle portions of each of the Mach-Zehnder type optical waveguides 31g, 32g, 33g, and 34g each branch into first arm optical waveguides 31a, 32a, 33a, and 34a and second arm optical waveguides 31b, 32b, 33b, and 34b and then merging.

The Mach-Zehnder type optical waveguide 31g of the first Mach-Zehnder interferometer 31 is input with the first TE polarized wave component Iy from the optical waveguide 17 (see FIG. 3) of the optical branching unit 10. In the same way, the Mach-Zehnder type optical waveguide 32g of the second Mach-Zehnder interferometer 32 is input with the second TE polarized wave component Ix from the optical waveguide 18 (see FIG. 3) of the optical branching unit 10. The Mach-Zehnder type optical waveguide 33g of the third Mach-Zehnder interferometer 33 is input with the third TE polarized wave component Qx from the optical waveguide 19 (see FIG. 3) of the optical branching unit 10. Also, the Mach-Zehnder type optical waveguide 34g of the fourth Mach-Zehnder interferometer 34 is input with the fourth TE polarized wave component Qy from the optical waveguide 20 (see FIG. 3) of the optical branching unit 10.

Figure 6A:
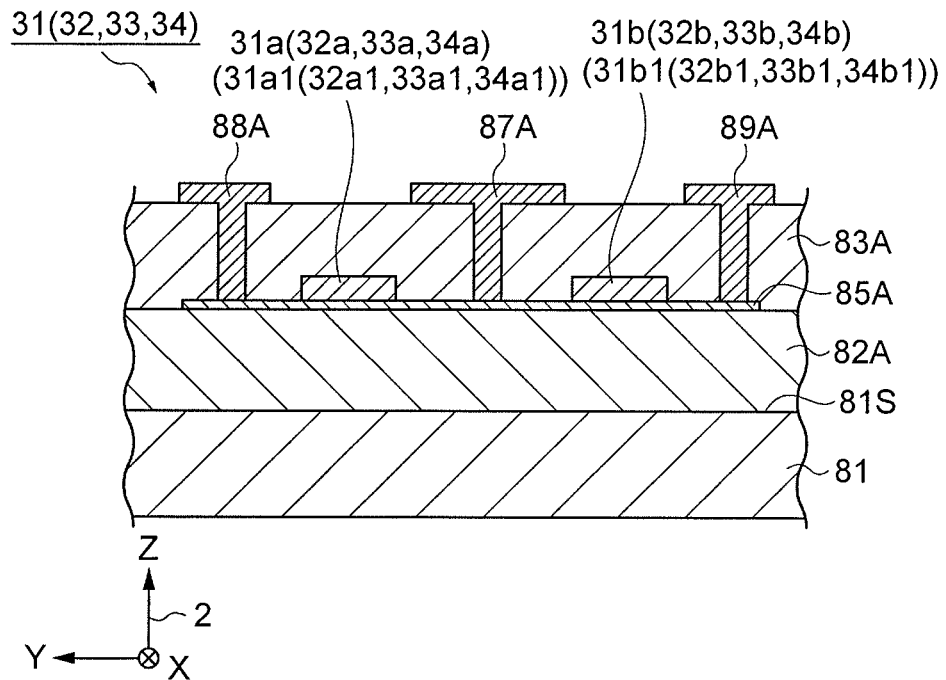
FIGS. 6A and 6B are diagrams illustrating examples of cross-sectional views of an optical modulation unit.

FIG. 6A is a diagram illustrating an example of an optical modulating unit. FIG. 6A illustrates a cross-section of the optical modulating unit 30, taken along a plane intersecting the first arm optical waveguide 31a (or first arm optical waveguide 32a, first arm optical waveguide 33a, first arm optical waveguide 34a) and the second arm optical waveguide 31b (or second arm optical waveguide 32b, second arm optical waveguide 33b, and second arm optical waveguide 34b) of the first Mach-Zehnder interferometer 31 (or second Mach-Zehnder interferometer 32, third Mach-Zehnder interferometer 33, fourth Mach-Zehnder interferometer 34), and orthogonal to the optical waveguide direction of these optical waveguides.

As illustrated in FIG. 6A, the first arm optical waveguide 31a (or first arm optical waveguide 32a, first arm optical waveguide 33a, first arm optical waveguide 34a), and the second arm optical waveguide 31b (or second arm optical waveguide 32b, second arm optical waveguide 33b, and second arm optical waveguide 34b), according to the present example are so called buried optical waveguides. The substrate 81 is formed of a single element semiconductor material such as silicon (Si) or the like. The first Mach-Zehnder interferometer 31 (or second Mach-Zehnder interferometer 32, third Mach-Zehnder interferometer 33, fourth Mach-Zehnder interferometer 34) is formed on the principal surface 81S of the substrate 81.

The first Mach-Zehnder interferometer 31 (or second Mach-Zehnder interferometer 32, third Mach-Zehnder interferometer 33, fourth Mach-Zehnder interferometer 34) has a substrate 81 which has a principal surface 81S, a lower cladding region 82A, a core 85A of a slab waveguide, a first arm optical waveguide core region 31a1 (32a1, 33a1, 34a1) and a second arm optical waveguide core region 31b1 (32b1, 33b1, 34b1), an upper cladding region 83A, and electrodes 87A, 88A, and 89A. The lower cladding region 82A is formed upon the principal surface 81S of the substrate 81. The core 85A of the slab waveguide is formed on the lower cladding region 82A, and has thickness dimensions along the Z axis. The first arm optical waveguide core region 31a1 (32a1, 33a1, 34a1) and second arm optical waveguide core region 31b1 (32b1, 33b1, 34b1) are formed on a portion of the surface of the core 85A of the slab waveguide, and extends along the X axis direction. Also, the upper cladding region 83A is formed upon the lower cladding region 82A, the core 85A of the slab waveguide, and the first arm optical waveguide core region 31a1 (32a1, 33a1, 34a1) and second arm optical waveguide core region 31b1 (32b1, 33b1, 34b1) so as to embed the first arm optical waveguide core region 31a1 (32a1, 33a1, 34a1) and second arm optical waveguide core region 31b1 (32b1, 33b1, 34b1).

The electrode 87A passes through an opening formed in the upper cladding region 83A and reaches from the upper face of the upper cladding region 83A to a portion of the core 85A of the slab waveguide which is between the first arm optical waveguide core region 31a1 (32a1, 33a1, 34a1) and second arm optical waveguide core region 31b1 (32b1, 33b1, 34b1) in plane view (from the Z axis direction). The electrode 88A passes through an opening formed in the upper cladding region 83A and reaches from the upper face of the upper cladding region 83A to a portion of the core 85A of the slab waveguide which is on the positive side on the Y axis from the first arm optical waveguide core region 31a1 (32a1, 33a1, 34a1) in plane view. The electrode 89A passes through an opening formed in the upper cladding region 83A and reaches from the upper face of the upper cladding region 83A to a portion of the core 85A of the slab waveguide which is on the negative side on the Y axis from the second arm optical waveguide core region 31b1 (32b1, 33b1, 34b1) in plane view.

With the buried optical waveguide according to this example, the first arm optical waveguide core region 31a1 (32a1, 33a1, 34a1) stipulates the optical waveguide and optical waveguide direction of the first arm optical waveguide 31a (or first arm optical waveguide 32a, first arm optical waveguide 33a, first arm optical waveguide 34a). Accordingly, with the present example, the shape of the first arm optical waveguide core region 31a1 (32a1, 33a1, 34a1) corresponds to the shape of the first arm optical waveguide 31a (or first arm optical waveguide 32a, first arm optical waveguide 33a, first arm optical waveguide 34a) illustrated in plane view in FIG. 5 with solid lines.

In the same way, with the buried optical waveguide according to this example, the second arm optical waveguide core region 31b1 (32b1, 33b1, 34b1) stipulates the optical waveguide and optical waveguide direction of the second arm optical waveguide 31b (or second arm optical waveguide 32b, second arm optical waveguide 33b, second arm optical waveguide 34b). Accordingly, with the present example, the shape of the second arm optical waveguide core region 31b1 (32b1, 33b1, 34b1) corresponds to the shape of the second arm optical waveguide 31b (or second arm optical waveguide 32b, second arm optical waveguide 33b, second arm optical waveguide 34b) illustrated in plane view in FIG. 5 with solid lines.

The Mach-Zehnder type optical waveguide 31g (32g, 33g, 34g) and core 85A of the slab waveguide are formed of the same material as the core region 11a (13a, 14a, 17a, 18a, 19a, 20a) of the optical waveguide 11 (13, 14, 17, 18, 19, 20) (see FIG. 4A). The thickness of the core 85A of the slab waveguide in the Z axis direction is, for example, 50 nm. The thickness of the first arm optical waveguide core region 31a (32a, 33a, 34a) and second arm optical waveguide core region 31b (32b, 33b, 34b) in the z axis direction is, for example, 170 nm. Also, the width of the first arm optical waveguide core region 31a (32a, 33a, 34a) and second arm optical waveguide core region 31b (32b, 33b, 34b) in the direction orthogonal to the optical waveguide direction (the horizontal direction in FIG. 6A) is, for example, 500 nm.

Figure 6B:
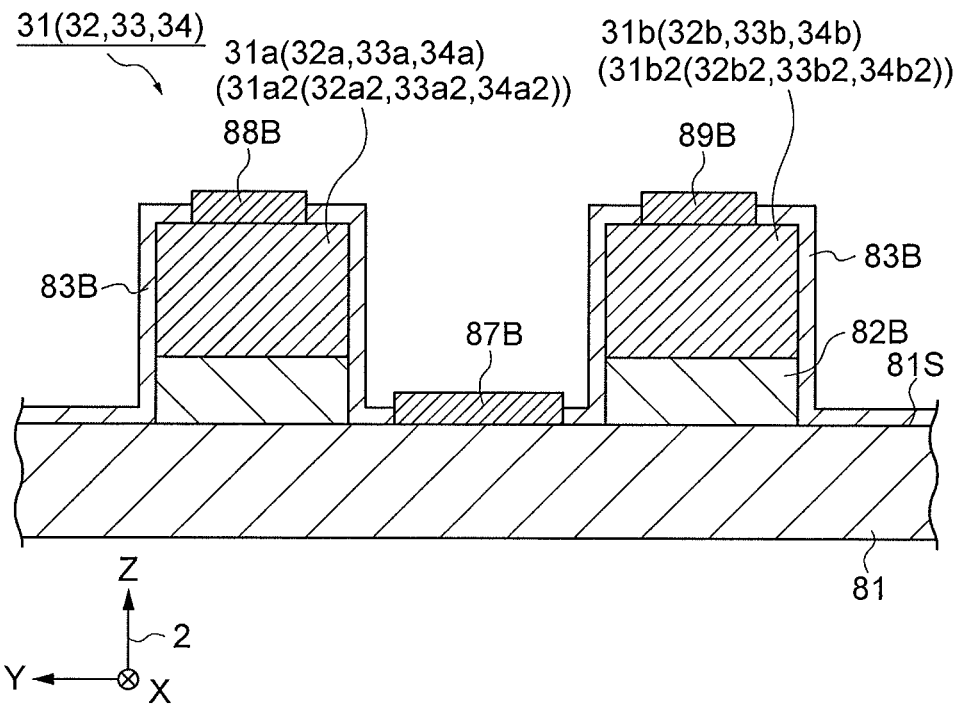

FIG. 6B is a diagram illustrating another example of a cross-section of an optical modulating unit. FIG. 6B illustrates a cross-section of the optical modulating unit 30, taken along a plane intersecting the first arm optical waveguide 31a (or first arm optical waveguide 32a, first arm optical waveguide 33a, first arm optical waveguide 34a) and the second arm optical waveguide 31b (or second arm optical waveguide 32b, second arm optical waveguide 33b, and second arm optical waveguide 34b) of the first Mach-Zehnder interferometer 31 (or second Mach-Zehnder interferometer 32, third Mach-Zehnder interferometer 33, fourth Mach-Zehnder interferometer 34), and orthogonal to the optical waveguide direction of these optical waveguides.

As illustrated in FIG. 6B, the first arm optical waveguide 31a (or first arm optical waveguide 32a, first arm optical waveguide 33a, first arm optical waveguide 34a), and the second arm optical waveguide 31*b* (or second arm optical waveguide 32*b*, second arm optical waveguide 33*b*, and second arm optical waveguide 34*b*), according to the present example, are so called mesa optical waveguides. The substrate 81 is formed of a III-V group compound semiconductor material such as InP or the like. The first Mach-Zehnder interferometer 31 (or second Mach-Zehnder interferometer 32, third Mach-Zehnder interferometer 33, fourth Mach-Zehnder interferometer 34) is formed on the principal surface 81S of the substrate 81.

The first Mach-Zehnder interferometer 31 (or second Mach-Zehnder interferometer 32, third Mach-Zehnder interferometer 33, fourth Mach-Zehnder interferometer 34) includes a substrate 81, a pair of core regions 82B, a first arm optical waveguide upper cladding region 31*a*2 (32*a*2, 33*a*2, 34*a*2) and second arm optical waveguide upper cladding region 31*b*2 (32*b*2, 33*b*2, 34*b*2), a protective film 83B, and electrodes 87B, 88B, and 89B. The pair of core regions 82B is formed in a ridge shape on the principal surface 81S of the substrate 81. The first arm optical waveguide upper cladding region 31*a*2 (32*a*2, 33*a*2, 34*a*2) and second arm optical waveguide upper cladding region 31*b*2 (32*b*2, 33*b*2, 34*b*2) are formed on the ridge shape of the pair of core regions 82B, extending in a direction following the X axis. The protective film 83B is conformally formed upon the substrate 81, the pair of core regions 82B, and the first arm optical waveguide upper cladding region 31*a*2 (32*a*2, 33*a*2, 34*a*2) and second arm optical waveguide upper cladding region 31*b*2 (32*b*2, 33*b*2, 34*b*2), so as to cover these. With the present example, the substrate 81 functions as the lower cladding region as to the core region 82B.

The electrode 87B is formed on the substrate 81, through an opening formed in the protective film 83B at a region between the pair of core regions 82B in planar view (form the Z-axial direction). The electrode 88B is formed on the first arm optical waveguide upper cladding region 31*a*2 (32*a*2, 33*a*2, 34*a*2), through an opening formed in the protective film 83B upon the first arm optical waveguide upper cladding region 31*a*2 (32*a*2, 33*a*2, 34*a*2) in plane view. The electrode 89B is formed on the second arm optical waveguide upper cladding region 31*b*2 (32*b*2, 33*b*2, 34*b*2), through an opening formed in the protective film 83B upon the second arm optical waveguide upper cladding region 31*b*2 (32*b*2, 33*b*2, 34*b*2) in plane view.

With the mesa optical waveguide according to the present example, the first arm optical waveguide upper cladding region 31*a*2 (32*a*2, 33*a*2, 34*a*2) stipulates the optical waveguide and optical waveguide direction of the first arm optical waveguide 31*a* (or first arm optical waveguide 32*a*, first arm optical waveguide 33*a*, first arm optical waveguide 34*a*). Accordingly, with the present example, the shape of the first arm optical waveguide upper cladding region 31*a*2 (32*a*2, 33*a*2, 34*a*2) corresponds to the shape of the first arm optical waveguide 31*a* (or first arm optical waveguide 32*a*, first arm optical waveguide 33*a*, first arm optical waveguide 34*a*) illustrated with solid lines in the plan view in FIG. 5.

In the same way, with the mesa optical waveguide according to the present example, the second arm optical waveguide upper cladding region 31*b*2 (32*b*2, 33*b*2, 34*b*2) stipulates the optical waveguide and optical waveguide direction of the second arm optical waveguide 31*b* (or second arm optical waveguide 32*b*, second arm optical waveguide 33*b*, second arm optical waveguide 34*b*). Accordingly, with the present example, the shape of the second arm optical waveguide upper cladding region 31*b*2 (32*b*2, 33*b*2, 34*b*2) corresponds to the shape of the second arm optical waveguide 31*b* (or second arm optical waveguide 32*b*, second arm optical waveguide 33*b*, second arm optical waveguide 34*b*) illustrated with solid lines in the plan view in FIG. 5.

Also, as illustrated in FIG. 5, the control unit 70 has a first driver 71, a second driver 72, a third driver 73, and a fourth driver 74, for driving the first Mach-Zehnder interferometer 31, second Mach-Zehnder interferometer 32, third Mach-Zehnder interferometer 33, and fourth Mach-Zehnder interferometer 34, respectively, and an encoding processing unit 77. The encoding processing unit 77 is input with electric signals ES which are data signals to be transmitted.

Based on the input electric signals ES, the encoding processing unit 77 generates first channel electric signals CS1, second channel electric signals CS2, third channel electric signals CS3, and fourth channel electric signals CS4, which have been subjected to pre-coding based on DP QPSK, and outputs these to the respective first driver 71, second driver 72, third driver 73, and fourth driver 74.

The first driver 71 controls the first Mach-Zehnder interferometer 31 so as to modulate the phase of the first TE polarized wave component Iy based on the first channel electric signals CS1. In the same way, the second driver 72 controls the second Mach-Zehnder interferometer 32 so as to modulate the phase of the second TE polarized wave component Ix based on the second channel electric signals CS2. The third driver 73 controls the third Mach-Zehnder interferometer 33 so as to modulate the phase of the third TE polarized wave component Qx based on the third channel electric signals CS3. Further, the fourth driver 74 controls the fourth Mach-Zehnder interferometer 34 so as to modulate the phase of the fourth TE polarized wave component Qy based on the fourth channel electric signals CS4.

With the present embodiment, voltage signals Vs are applied to the first arm optical waveguide 31*a* (or first arm optical waveguide 32*a*, first arm optical waveguide 33*a*, first arm optical waveguide 34*a*) of the first Mach-Zehnder interferometer 31 (or second Mach-Zehnder interferometer 32, third Mach-Zehnder interferometer 33, fourth Mach-Zehnder interferometer 34) by the first driver 71 (or second driver 72, third driver 73, fourth driver 74), based on the first channel electric signals CS1 (or second channel electric signals CS2, third channel electric signals CS3, fourth channel electric signals CS4). At the same time, voltage signals—Vs are applied to the second arm optical waveguide 31*b* (or second arm optical waveguide 32*b*, second arm optical waveguide 33*b*, second arm optical waveguide 34*b*). That is to say, voltage signals which are of the same absolute value and of opposite polarity to each other are applied to the first arm optical waveguide 31*a* (or first arm optical waveguide 32*a*, first arm optical waveguide 33*a*, first arm optical waveguide 34*a*) and second arm optical waveguide 31*b* (or second arm optical waveguide 32*b*, second arm optical waveguide 33*b*, second arm optical waveguide 34*b*).

Such voltage application can be performed by applying voltage signals Vs to the electrode 88A (or electrode 88B) and applying voltage signals—Vs to the electrode 89A (or electrode 89B), with the electrode 87A (or electrode 87B) as a ground electrode (see FIGS. 6A and 6B). Accordingly, with the present embodiment, the phase of the first TE polarized wave component Iy (or second TE polarized wave component Ix, third TE polarized wave component Qx, fourth TE polarized wave component Qy) is modulated so as to be a value of either 0 or $\pi$.

Note that the control unit 70 may also be formed on the substrate 81 in the same way as with the optical branching unit 10 and optical modulating unit 30 (see FIGS. 4A, 4B, 6A, and 6B), or may be formed on a separate substrate from the substrate 81.

Optical Operation Unit

Figure 7:
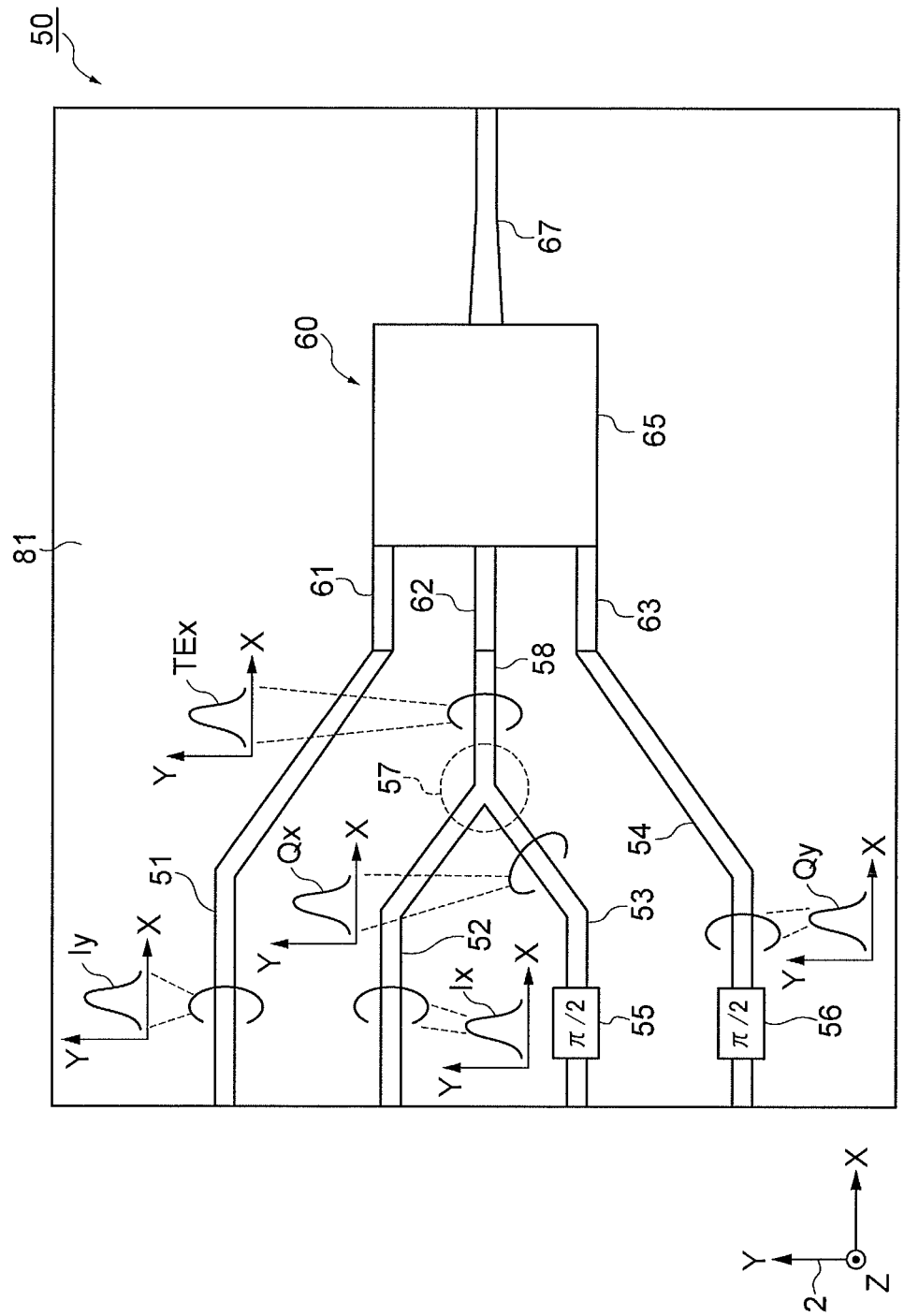
FIG. 7 is a schematic plan view illustrating the configuration of an optical operation unit.

FIG. 7 is a schematic plan view illustrating the configuration of an optical operation unit. As illustrated in FIG. 7, the optical operation unit 50 includes optical waveguides 51, 52, 53, 54, and 58, a first phase change unit 55, a second phase-change unit 56, an optical multiplexer 57, and a multimode interference (MMI) coupler 60. Also, the multimode interference coupler 60 includes a multimode interference optical waveguide 65, a first input port 61, a second input port 62, a third input port 63, and an output port 67.

The optical waveguides 51, 52, 53, 54, and 58, first input port 61, second input port 62, third input port 63, and output port 67, are each optical waveguides to guide light in a direction following the XY plane. With the present embodiment, the optical waveguides 51, 52, 53, 54, and 58, first input port 61, second input port 62, third input port 63, and output port 67 are configured of planar optical waveguides with the thickness direction thereof being in the Z axis direction. The multimode interference optical waveguide 65 has a function to guide multiple lights input from the first input port 61, the second input port 62, and the third input port 63, in the X axis direction while causing interference between one another, and to output the light following interference from the output port 67, which will be described in detail later. With the present embodiment, the multimode interference optical waveguide 65 is configured of a planar optical waveguide. Also, the first input port 61 and the third input port 63 are configured of single-mode optical waveguides.

One end of the optical waveguide 51 is optically connected with the Mach-Zehnder type optical waveguide 31g of the first Mach-Zehnder interferometer 31 (see FIG. 5). On the other hand, the other end of the optical waveguide 51 is optically connected with the first input port 61 of the multimode interference coupler 60. Accordingly, the first TE polarized wave component Iy modulated by the first Mach-Zehnder interferometer 31 (see FIG. 5) is input to the first input port 61 of the multimode interference coupler 60 having been guided through the optical waveguide 51.

One end of the optical waveguide 52 is optically connected with the Mach-Zehnder type optical waveguide 32g of the second Mach-Zehnder interferometer 32 (see FIG. 5). On the other hand, the other end of the optical waveguide 52 is optically connected with the optical multiplexer 57. Accordingly, the second TE polarized wave component Ix modulated by the second Mach-Zehnder interferometer 32 (see FIG. 5) is input to the optical multiplexer 57 having been guided through the optical waveguide 52.

One end of the optical waveguide 53 is optically connected with the Mach-Zehnder type optical waveguide 33g of the third Mach-Zehnder interferometer 33 (see FIG. 5). On the other hand, the other end of the optical waveguide 53 is optically connected with the optical multiplexer 57. Also, a first phase-change unit 55 which changes the phase of the third TE polarized wave component Qx by a predetermined angle is provided on the optical waveguide 53. Accordingly, the third TE polarized wave component Qx modulated by the third Mach-Zehnder interferometer 33 (see FIG. 5) is input to the optical multiplexer 57 having been guided through the optical waveguide 53 and the phase thereof having been changed by a predetermined angle by the first phase-change unit 55.

With the present embodiment, the first phase-change unit 55 is a 702 phase shifter. The phase of the third TE polarized wave component Qx is changed by $\pi/2$ by the first phase-change unit 55. Accordingly, with the present embodiment, the phase of the third TE polarized wave component Qx after the phase has been changed by the first phase-change unit 55 is either the value $\pi/2$ or $3\pi/2$. That is to say, with the present embodiment, the phase of the second TE polarized wave component Ix immediately before entering the optical multiplexer 57 and the phase of the third TE polarized wave component Qx immediately before entering the optical multiplexer 57 are orthogonal.

The optical multiplexer 57 generates a fifth TE polarized wave component TEx as a fifth linearly-polarized wave component, by coupling (multiplexing) the second TE polarized wave component Ix input from the optical waveguide 52 and the third TE polarized wave component Qx input from the optical waveguide 53, and outputs this fifth TE polarized wave component Tex. With the present embodiment, the optical multiplexer 57 is configured of a Y-branch optical waveguide. The fifth TE polarized wave component TEx output from the optical multiplexer 57 is guided through the optical waveguide 58 and input to the second input port 62 of the multimode interference coupler 60.

One end of the optical waveguide 54 is optically connected with the Mach-Zehnder type optical waveguide 34g of the fourth Mach-Zehnder interferometer 34 (see FIG. 5). On the other hand, the other end of the optical waveguide 54 is optically connected with the third input port 63 of the multimode interference coupler 60. Also, a second phase-change unit 56 which changes the phase of the fourth TE polarized wave component Qy by a predetermined angle is provided on the optical waveguide 54. Accordingly, the fourth TE polarized wave component Qy modulated by the fourth Mach-Zehnder interferometer 34 (see FIG. 5) is guided through the optical waveguide 54 and the phase thereof is changed by a predetermined angle by the second phase-change unit 56. The fourth TE polarized wave component Qy is input to the third input port 63 of the multimode interference coupler 60 after having passed through the second phase-change unit 56.

With the present embodiment, the second phase-change unit 56 is a $\pi/2$ phase shifter. The phase of the fourth TE polarized wave component Qy is changed by $\pi/2$ by the second phase-change unit 56. Accordingly, with the present embodiment, the phase of the fourth TE polarized wave component Qy after the phase has been changed by the second phase-change unit 56 is either the value $\pi/2$ or $3\pi/2$. That is to say, with the present embodiment, the phase of the first TE polarized wave component Iy immediately before entering the first input port 61 and the phase of the fourth TE polarized wave component Qy immediately before entering the third input port 63 are orthogonal.

The optical waveguides 51, 52, 53, 54, and 58 have the same configuration as the optical waveguides 11, 13, 14, 17, 18, 19, and 20 (see FIGS. 4A and 4B). Also, the configuration of the cross-section of the optical operation unit 50 taken along a plane intersecting the optical waveguide 51 (52, 53, 54, 58) and orthogonal to the optical waveguide direction of the optical waveguide 51 (52, 53, 54, 58) is the same as the configuration of the cross-section of the optical branching unit 10 taken along a plane intersecting the optical waveguide 11 (13, 14, 17, 18, 19, 20) and orthogonal to the optical waveguide direction of the optical waveguide 11 (13, 14, 17, 18, 19, 20) (see FIGS. 4A and 4B).

Accordingly, when the optical waveguide 51 (52, 53, 54, 58) is a buried optical waveguide, the core region 11a (13a, 14a, 17a, 18a, 19a, 20a) stipulates the optical waveguide and optical waveguide direction of the optical waveguide 51 (52, 53, 54, 58). Accordingly, the shape of the core region 11a (13a, 14a, 17a, 18a, 19a, 20a) corresponds to the shape of the optical waveguide 51 (52, 53, 54, 58) illustrated with solid lines in the plan view in FIG. 7 (see FIG. 4A). Also, when the optical waveguide 51 (52, 53, 54, 58) is a ridge optical waveguide, the upper cladding region 11b (13b, 14b, 17b, 18b, 19b, 20b) stipulates the optical waveguide and optical waveguide direction of the optical waveguide 51 (52, 53, 54, 58). Accordingly, the shape of the upper cladding region 11b (13b, 14b, 17b, 18b, 19b, 20b) correlates to the shape of the optical waveguide 51 (52, 53, 54, 58) illustrated with solid lines in the plane view in FIG. 7.

Figure 8:
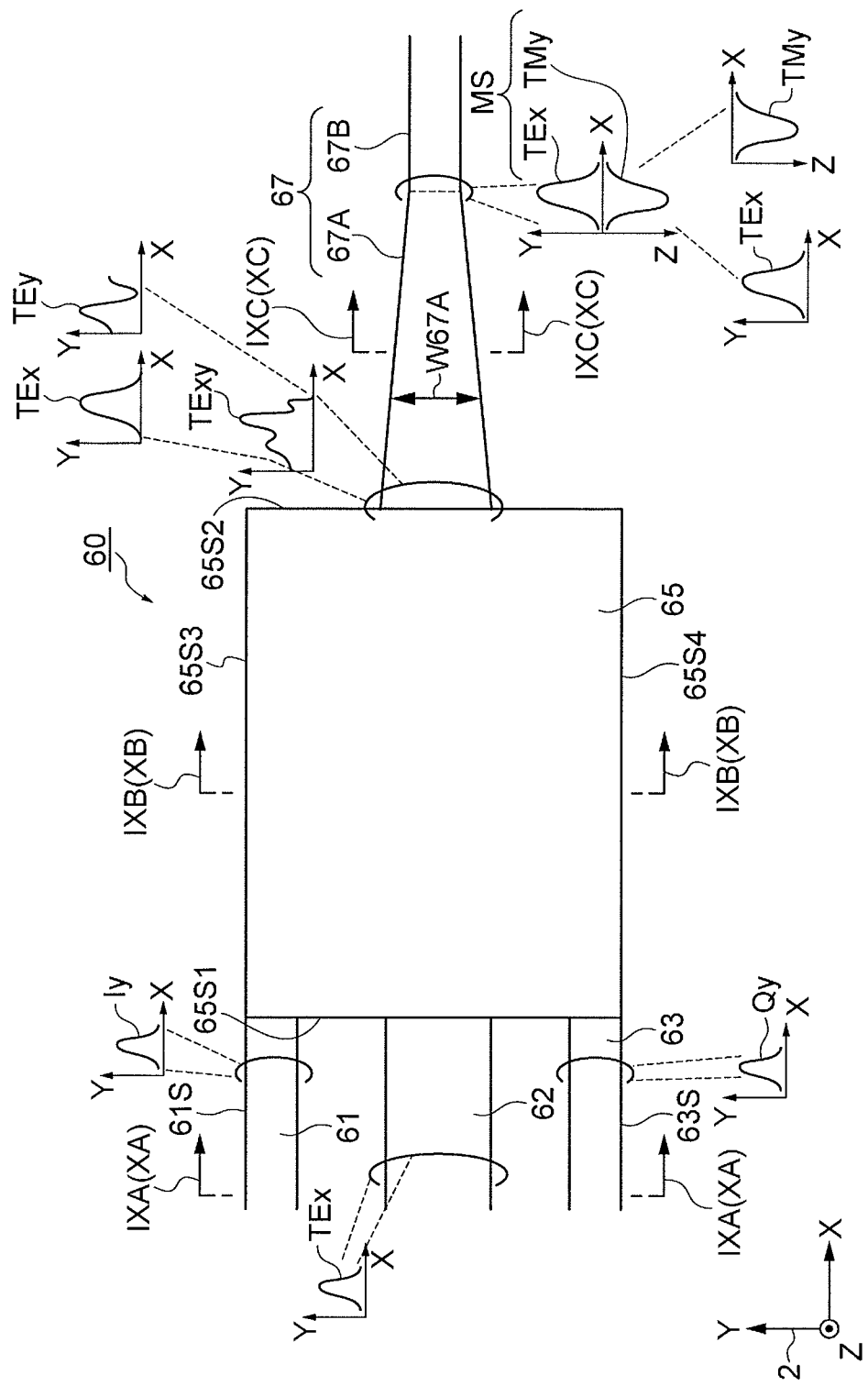
FIG. 8 is a schematic plan view illustrating the configuration around a multimode interference coupler of an optical operation unit.

Next, the configuration of the multimode interference coupler 60 will be described in detail. FIG. 8 is a schematic plan diagram illustrating the configuration around the multimode interference coupler of the optical operation unit. As illustrated in FIG. 8, the multimode interference optical waveguide 65 of the multimode interference coupler 60 has a generally rectangular shape in plan view (when viewed from the Z axis direction as a first direction) with the present embodiment. The multimode interference coupler 60 has a first outer edge 65S1 having a straight line form extending in the Y axis direction, a second outer edge 65S2 having a straight line form extending in the Y axis direction, a third outer edge 65S3 having a straight line form extending in the X axis direction, and a fourth outer edge 65S4 having a straight line form extending in the X axis direction, in plan view. The second outer edge 65S2 faces the first outer edge 65S1. The first input port 61, second input port 62, and third input port 63 each extend in the X axis direction, and are in contact with the first outer edge 65S1. The third outer edge 65S3 and fourth outer edge 65S4 are in contact with the first outer edge 65S1 and second outer edge 65S2.

The output port 67 extends in the X axis direction, and is in contact with the second outer edge 65S2. Also, the output port 67 has a taper-shaped core region 67A of which the width (Y axis direction) orthogonal to the optical waveguide direction of the output port 67 (X axis direction) gradually decreases away from the multimode interference optical waveguide 65 (toward the positive direction of the X axis), and a fixed-width core region 67B of which the width (Y axis direction) orthogonal to the optical waveguide direction of the output port 67 (X axis direction) is constant. One end of the taper-shaped core region 67A in the X-axis direction is in contact with the second outer edge 65S2 of the multimode interference optical waveguide 65, and the other end of the taper-shaped core region 67A in the X-axis direction is in contact with the end of the fixed-width core region 67B.

Also, as illustrated in FIG. 8, the second input port 62 is provided between the first input port 61 and the third input port 63. Note that the second input port 62 is preferably provided at the general center of the first outer edge 65S1.

The first input port 61 is in contact with one end of the first outer edge 65S1 of the multimode interference optical waveguide 65 in plan view. Specifically, the first input port 61 is connected to one end of the first outer edge 65S1 such that an outer edge 61S of the first input port 61 is steplessly connected to the third outer edge 65S3 of the multimode interference optical waveguide 65 in plane view. More specifically, the first input port 61 is connected to one end of the first outer edge 65S1 such that the outer edge 61S of the region stipulating the optical waveguide and optical waveguide direction of the first input port 61 (e.g., core region 61a of the first input port (see FIG. 9A), upper cladding region 61b of the first input port (see FIG. 10A)) is steplessly connected to the third outer edge 65S3 of the region stipulating the optical waveguide and optical waveguide direction of the multimode interference optical waveguide 65 (e.g., core region 62a of the second input port (see FIG. 9A), upper cladding region of the second input port 62b (see FIG. 10A)).

Also, the third input port 63 is in contact with the other end of the first outer edge 65S1 of the multimode interference optical waveguide 65 in plan view. Specifically, the third input port 63 is connected to the other end of the first outer edge 65S1 such that the third outer edge 65S3 of the third input port 63 is steplessly connected to the fourth outer edge 65S4 of the multimode interference optical waveguide 65 in plane view. More specifically, the third input port 63 is connected to the other end of the first outer edge 65S1 such that the outer edge 63S of the region stipulating the optical waveguide and optical waveguide direction of the third input port 63 (e.g., core region 63a of the third input port (see FIG. 9A), upper cladding region 63b of the third input port (see FIG. 10A)) is steplessly connected to the third outer edge 65S3 of the region stipulating the optical waveguide and optical waveguide direction of the multimode interference optical waveguide 65 (e.g., core region 62a of the second input port (see FIG. 9A), upper cladding region of the second input port 62b (see FIG. 10A)).

The lengths of the first outer edge 65S1 and second outer edge 65S2 may be, for example, 6 μm, and the lengths of the third outer edge 65S3 and fourth outer edge 65S4 may be, for example, 70 μm.

Figure 9A:
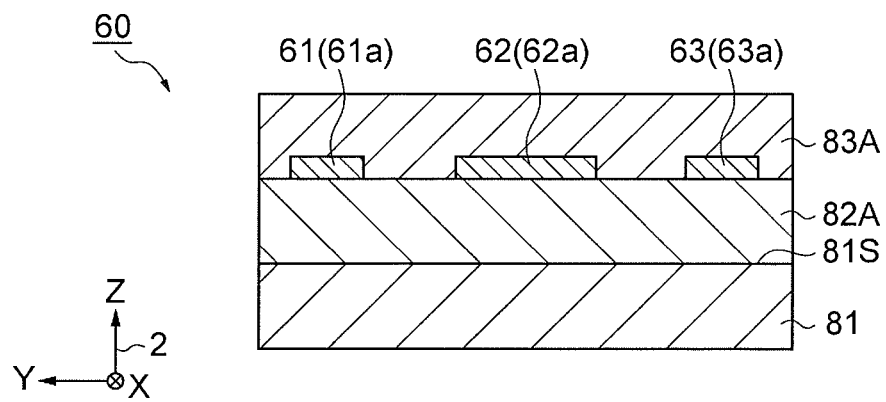
FIGS. 9A through 9C are diagrams illustrating an example of cross-sections of a multimode interference coupler.
Figure 9B:
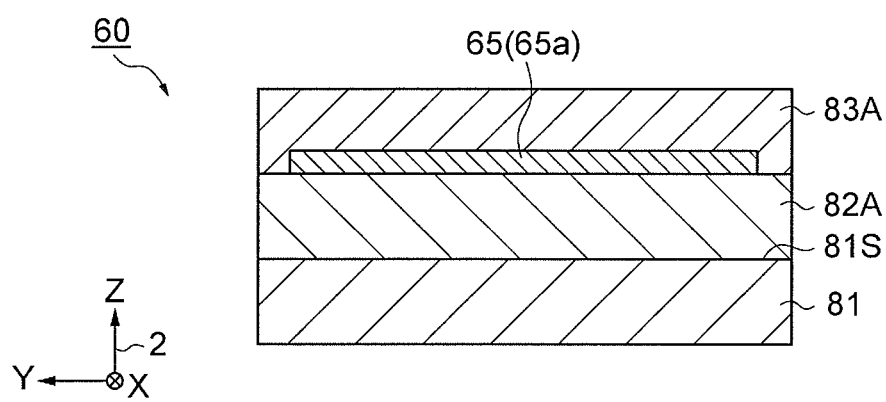
Figure 9C:
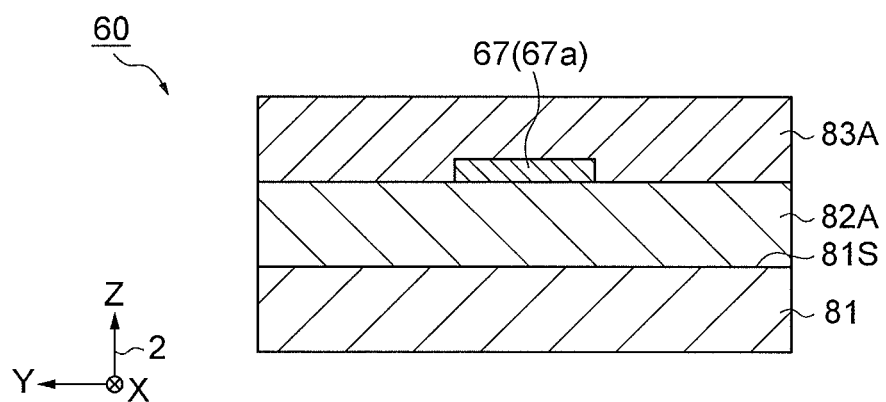

FIGS. 9A through 9C are diagrams illustrating examples of cross-sections of a multimode interference coupler. FIG. 9A is a cross-sectional view of a multimode interference coupler along line IXA-IXA in FIG. 8. FIG. 9B is a cross-sectional view of the multimode interference coupler along line IXB-IXB in FIG. 8. FIG. 9C is a cross-sectional view of the multimode interference coupler along line IXC-IXC in FIG. 8.

As illustrated in FIGS. 9A through 9C, the first input port 61, second input port 62, third input port 63, multimode interference optical waveguide 65, and output port 67, according to the present example, are each so-called buried optical waveguides. The substrate 81 is formed of a single element semiconductor material such as silicon (Si) or the like. The multimode interference coupler 60 is formed on the principal surface 81S of the substrate 81. Also, the multimode interference coupler 60 has a lower cladding region 82A, a first input port core region 61a, a second input port core region 62a, a third input port core region 63a (FIG. 9A), a multimode interference waveguide core region 65a (FIG. 9B), an output port core region 67a (FIG. 9C), and the upper cladding region 83A. Here, the lower cladding region 82A is formed on the principal surface 81S of the substrate 81. The first input port core region 61a, second input port core region 62a, third input port core region 63a, multimode interference waveguide core region 65a, and output port core region 67a are formed upon the lower cladding region 82A. Also, the upper cladding region 83A is formed upon these cores and the lower cladding region 82A, so as to embed the cores. The first input port core region 61a, second input port core region 62a, third input port core region 63a, multimode interference waveguide core region 65a, and output port core region 67a are formed of a single element semiconductor material such as silicon (Si) or the like, and have rectangular cross-sectional shapes.

In the example illustrated in FIGS. 9A through 9C, the width of the first input port core region 61a and third input port core region 63a in the Y axis direction may be, for example, 500 nm The width of the second input port core region 62a in the Y axis direction may be, for example, 1,000 nm Also, the width of the output port core region 67a of the tapered core region 67A in the Y axis direction may be, for example, 1,000 nm at the widest point, and the width of the output port core region 67a of the tapered core region 67A in the Y axis direction may be, for example, 500 nm at the narrowest point. The length of the tapered core region 67A in the X axis direction may be, for example, 80 μm.

With the buried optical waveguide according to the present example, the first input port core region 61a, second input port core region 62a, third input port core region 63a, multimode interference waveguide core region 65a, and output port core region 67a stipulate the optical waveguide and optical waveguide direction of the first input port 61, second input port 62, third input port 63, multimode interference optical waveguide 65, and output port 67, in respective order. With the present example, the shapes of the first input port core region 61a, second input port core region 62a, third input port core region 63a, multimode interference waveguide core region 65a, and output port core region 67a, correspond to the shapes of the first input port 61, second input port 62, third input port 63, multimode interference optical waveguide 65, and output port 67, illustrated with solid lines in the plan view in FIG. 8.

Figure 10A:
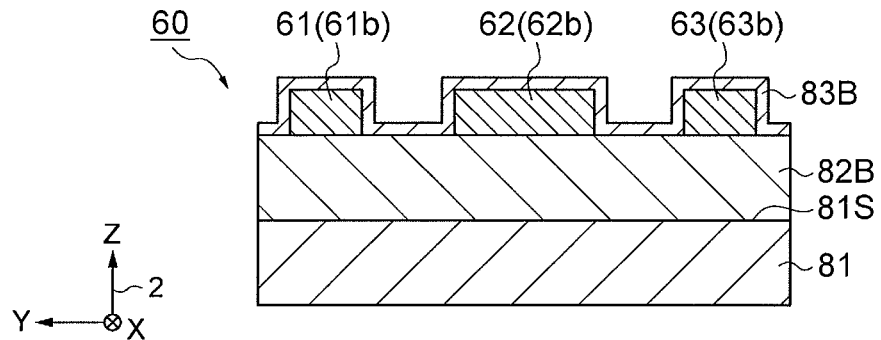
FIGS. 10A through 10C are diagrams illustrating another example of cross-sections of a multimode interference coupler.
Figure 10B:
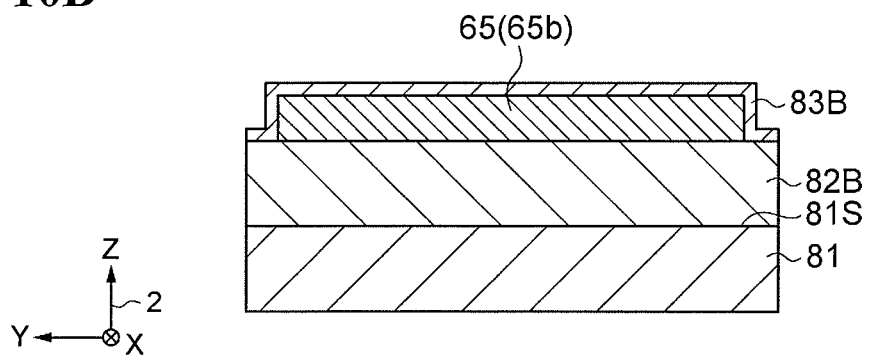
Figure 10C:
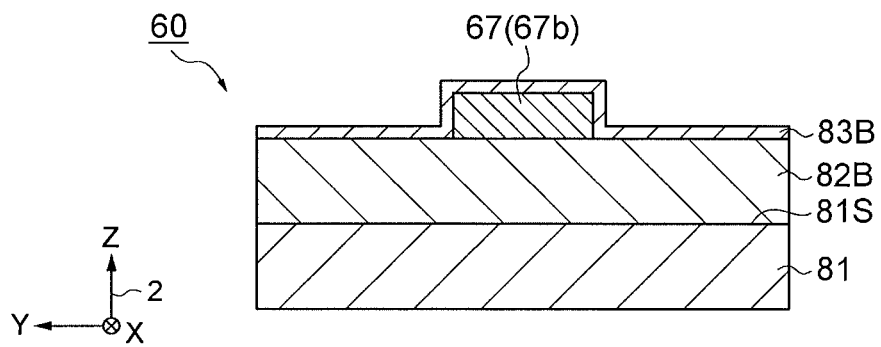

FIGS. 10A through 10C are diagrams illustrating other examples of cross-sections of a multimode interference coupler. FIG. 10A is a cross-sectional view of the multimode interference coupler along line XA-XA in FIG. 8. FIG. 10B is a cross-sectional view of the multimode interference coupler along line XB-XB in FIG. 8. FIG. 10C is a cross-sectional view of the multimode interference coupler along line XC-XC in FIG. 8.

As illustrated in FIGS. 10A through 10C, the first input port 61, second input port 62, third input port 63, multimode interference optical waveguide 65, and output port 67, according to the present example, are each so-called ridge waveguides. The substrate 81 is formed of a III-V group compound semiconductor material such as InP or the like. The multimode interference coupler 60 is formed on the principal surface 81S of the substrate 81. Also, the multimode interference coupler 60 has a core region 82B, a first input port upper cladding region 61b, a second input port upper cladding region 62b, a third input port upper cladding region 63b (FIG. 10A), a multimode interference waveguide upper cladding region 65b (FIG. 10B), an output port upper cladding region 67b (FIG. 10C), and the protective film 83B. Note that the core region 82B is formed on the principal surface 81S of the substrate 81. The first input port upper cladding region 61b, second input port upper cladding region 62b, third input port upper cladding region 63b, multimode interference waveguide upper cladding region 65b, and output port upper cladding region 67b, are formed on the core region 82B. Also, the protective film 83B is formed conformally on these upper cladding regions and core region 82B, so as to cover these upper cladding regions and core region 82B. With the present example, the substrate 81 functions as a lower cladding region as to the core region 82B. The first input port upper cladding region 61b, second input port upper cladding region 62b, third input port upper cladding region 63b, multimode interference waveguide upper cladding region 65b, and output port upper cladding region 67b are formed of a III-V group compound semiconductor such as InP or the like, and have rectangular cross-sectional shapes.

In the example illustrated in FIGS. 10A through 10C, the width of the first input port upper cladding region 61b and third input port upper cladding region 63b in the Y axis direction may be, for example, 3 μm. The width of the second input port upper cladding region 62b in the Y axis direction may be, for example, 5 μm. Also, the width of the output port upper cladding region 67b of the tapered core region 67A in the Y axis direction may be, for example, 5 μm at the widest point, and on the other hand, the width of the output port upper cladding region 67b of the tapered core region 67A in the Y axis direction may be, for example, 3 μm at the narrowest point. The length of the tapered core region 67A in the X axis direction may be, for example, 300 μm.

With the ridge optical waveguide according to the present example, the first input port upper cladding region 61b, second input port upper cladding region 62b, third input port upper cladding region 63b, multimode interference waveguide upper cladding region 65b, and output port upper cladding region 67b stipulate the optical waveguide and optical waveguide direction of the first input port 61, second input port 62, third input port 63, multimode interference optical waveguide 65, and output port 67, in respective order. With the present example, the shapes of the first input port upper cladding region 61b, second input port upper cladding region 62b, third input port upper cladding region 63b, multimode interference waveguide upper cladding region 65b, and output port upper cladding region 67b, correspond to the shapes of the first input port 61, second input port 62, third input port 63, multimode interference optical waveguide 65, and output port 67, illustrated with solid lines in the plan view in FIG. 8.

As illustrated in FIG. 8, the first TE polarized wave component Iy input to the first input port 61 is guided through the first input port 61 in the fundamental mode, and is input to the multimode interference optical waveguide 65.

The fifth TE polarized wave component TEx input to the second input port 62 is guided through the second input port 62 in the fundamental mode, and is input to the multimode interference optical waveguide 65. The fourth TE polarized wave component Qy input to the third input port 63 is guided through the third input port 63 in the fundamental mode, and is input to the multimode interference optical waveguide 65.

The first TE polarized wave component Iy, fifth TE polarized wave component TEx, and fourth TE polarized wave component Qy, input to the multimode interference optical waveguide 65, are coupled with each other in the multimode interference optical waveguide 65, thereby forming TE polarized waves TExy which are input to the taper-shaped core region 67A of the output port 67. The multimode interference coupler 60 is configured such that the following Condition 1 and Condition 2 are satisfied at this time.

Condition 1

The fifth TE polarized wave component TEx is guided through the multimode interference optical waveguide 65 while maintaining the polarization state thereof (i.e., maintaining the state of TE polarization) in the fundamental mode, and is input to the output port 67 as part of the TE polarized waves TExy.

Condition 2

The first TE polarized wave component Iy and fourth TE polarized wave component Qy are guided through the multimode interference optical waveguide 65 while maintaining the polarization state thereof (i.e., maintaining the state of TE polarization), while being optically coupled and converted to first-order mode, and input to the output port 67 as part of sixth TE polarized wave component TEy serving as sixth linearly-polarized wave component which is another part of the TE polarized waves TExy.

Due to the above Condition 1 and Condition 2 being satisfied, the TE polarized waves TExy immediately before being input to the taper-shaped core region 67A is made up of the fifth TE polarized wave component TEx in the fundamental mode and sixth TE polarized wave component TEy in the first order mode which have been optically coupled.

The above Condition 1 and Condition 2 can be satisfied by suitably selecting the width and length of the multimode interference optical waveguide 65 (length of first outer edge 65S1 and second outer edge 65S2, and length of third outer edge 65S3 and fourth outer edge 65S4), the thickness and shape thereof, the refractive index of the material making up the core and cladding of the multimode interference optical waveguide 65, the contact positions of the first input port 61, second input port 62, and third input port 63 at the first outer edge 65S1, the contact position of the output port 67 at the second outer edge 65S2, and the widths of the first input port 61, second input port 62, third input port 63, and output port 67.

With the effective refractive index of the core of the multimode interference optical waveguide 65 as to the first TE polarized wave component Iy and fourth TE polarized wave component Qy as n, the length of the first outer edge 65S1 as W, and the wavelength of the first TE polarized wave component Iy and fourth TE polarized wave component Qy as $\lambda$, the length L of the third outer edge 65S3 and fourth outer edge 65S4 of the multimode interference optical waveguide 65 preferably satisfies, or approximately satisfies $L=(n \times W)/\lambda$. When the length L satisfies, or approximately satisfies, this condition, the point where the sixth TE polarized wave component TEy is imaged within the multimode interference optical waveguide 65 generally matches the interface between the multimode interference optical waveguide 65 and the output port 67. Accordingly, the coupling efficiency between the sixth TE polarized wave component TEy and the taper-shaped core region 67A can be improved.

Next, the functions of the multimode interference coupler 60 which satisfies the above Condition 1 and Condition 2 will be described based on calculation results from simulation.

Figure 11:
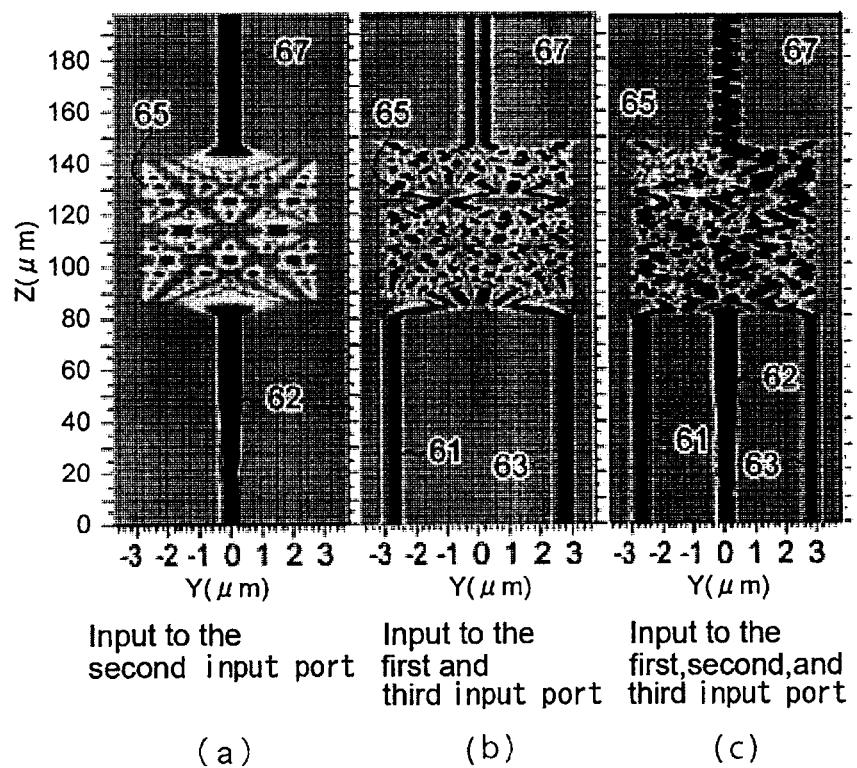
FIG. 11 is a diagram illustrating results of calculation of optical intensity within a multimode interference coupler by simulation.

FIG. 11 is a diagram illustrating the results of calculation by simulation using the Beam Propagation Method (BPM) regarding the light intensity within the multimode interference coupler 60 in a case of input of continuous TE polarized waves of 1,550 nm in wavelength, to the input ports of the multimode interference coupler 60 which satisfies the above Condition 1 and Condition 2.

In FIG. 11, (a) to the left illustrates the calculation results of input of fundamental mode TE polarized waves to the second input port 62, (b) at the middle illustrates the calculation results of input of fundamental mode TE polarized waves to each of the first input port 61 and third input port 63, and (c) to the right illustrates the calculation results of input of fundamental mode TE polarized waves to each of the first input port 61, second input port 62, and third input port 63.

As illustrated in (a) to the left in FIG. 11, it is confirmed that when fundamental mode TE polarized waves are input to the second input port 62, fundamental mode TE polarized waves are input to the output port 67. Also, as illustrated in (b) at the middle in FIG. 11, it is confirmed that when fundamental mode TE polarized waves are input to each of the first input port 61 and third input port 63, first-order mode TE polarized waves are input to the output port 67. Further, as illustrated in (c) to the right in FIG. 11, it is confirmed that when fundamental mode TE polarized waves are input to each of the first input port 61, second input port 62, and third input port 63, optically coupled polarized light of fundamental mode TE polarized waves and first-order mode TE polarized waves are input to the output port 67.

The fifth TE polarized wave component TEx generated as described above is guided through the taper-shaped core region 67A of the output port 67 and input to the fixed-width core region 67B. At this time, the width of the taper-shaped core region 67A of the output port 67 in the perpendicular direction (Y axis direction) as to the optical waveguide direction thereof is configured so as to gradually decrease the farther away from the multimode interference waveguide, so that the following Condition 3 and Condition 4 are satisfied.

Here, the width of the taper-shaped core region 67A of the output port 67 is the width in the Y axis direction of the region stipulating the optical waveguide and optical waveguide direction (e.g., output port core region 67a (see FIG. 9C), upper cladding region 67b of the output port (see FIG. 10C)).

Condition 3

The fifth TE polarized wave component TEx of the TE polarized waves TExy input to the output port 67 is guided through the taper-shaped core region 67A of the output port 67 in the fundamental mode while maintaining the polarization state (while maintaining the TE polarization state).

Condition 4

The sixth TE polarized wave component TEy of the TE polarized waves TExy input to the output port 67 is guided through the taper-shaped core region 67A of the output port 67 in the fundamental mode while the plane of polarization thereof being rotated by a predetermined angle and converted into a seventh linearly-polarized wave component in the fundamental mode.

The predetermined angle in the above Condition 4 is 90 degrees in the present embodiment, so the seventh linearly-polarized wave component is a seventh Transverse Magnetic (TM) polarized wave component TMy. Accordingly, with the present embodiment, the plane of polarization of the fifth TE polarized wave component TEx and the plane of polarization of the seventh TM polarized wave component TMy are orthogonal.

Due to the above Condition 3 and Condition 4 being satisfied, the TE polarized waves TExy are converted into DP QPSK signal light MS between input to the taper-shaped core region 67A and immediately before input to the fixed-width core region 67B. This DP QPSK signal light MS according to the present embodiment is dual polarization signal light made up of two linearly-polarized wave components (the fifth TE polarized wave component TEx and seventh TM polarized wave component TMy) orthogonal to each other. The DP QPSK optical modulator LM externally emits the DP QPSK signal light MS (see FIG. 2).

The above Condition 3 and Condition 4 can be satisfied by suitably selecting the width in the Y axis direction of the widest portion of the taper-shaped core region 67A (the portion in contact with the second outer edge 65S2 of the multimode interference optical waveguide 65 with the present embodiment), the width in the Y axis direction of the narrowest portion of the taper-shaped core region 67A (the portion in contact with the fixed-width core region 67B with the present embodiment), the length of the taper-shaped core region 67A in the X axis direction, the refractive indices of the materials constituting the core region and the cladding region of the taper-shaped core region 67A, and the thicknesses of the core region and the cladding region of the taper-shaped core region 67A.

Next, the principle whereby an output port 67P including the taper-shaped core region 67A has exhibits functions such as stipulated in Condition 3 and Condition 4 will be described.

Figure 12:
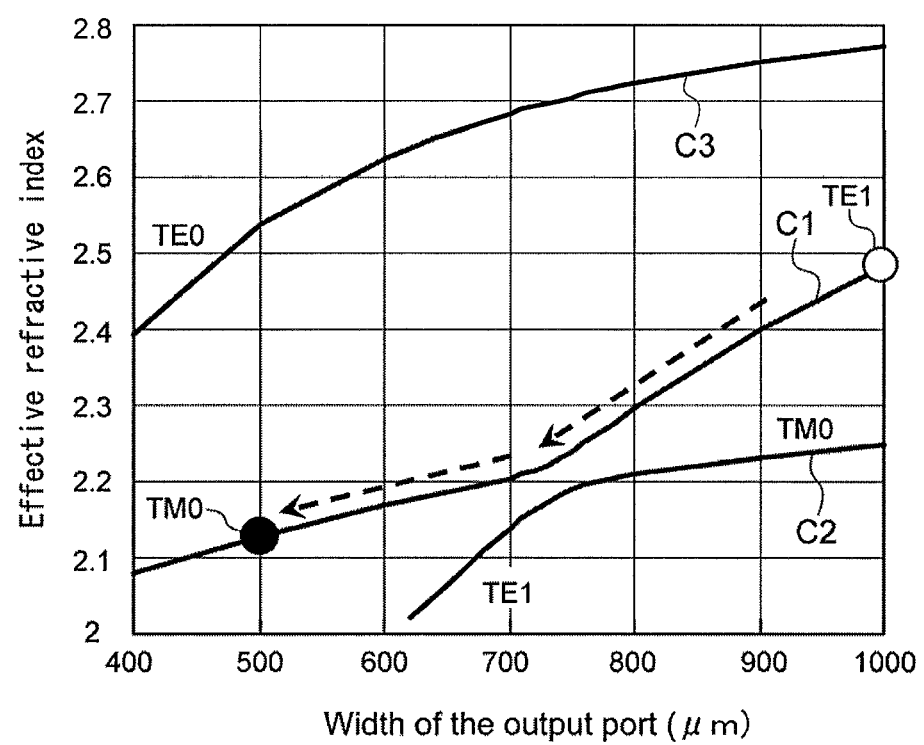
FIG. 12 is a diagram illustrating, regarding light of each intrinsic mode guided through an output port, calculation results of the relation between the width of the output port and the effective refractive index.

FIG. 12 is a diagram illustrating the result of calculating the relationship between the width of the output port 67 and the effective refractive index for each eigenmode guided through the output port 67 having the cross-sectional structure such as illustrated in FIG. 9C. The horizontal axis represents the width of the output port 67 in the Y axis direction (the width in the Y axis direction of the region stipulating the optical waveguide and optical waveguide direction of the output port 67). The vertical axis represents the effective refractive index for each eigenmode (fundamental mode TE polarized waves (TE0), fundamental mode TM polarized waves (TM0), first-order mode TE polarized waves (TE1)). Calculation is made here assuming the substrate 81 to be formed of silicon, the lower cladding region 82A to be formed of silicon oxide ($SiO_2$) to a thickness in the Z axis direction of 2 μm, the output port 67 to be formed of silicon to a thickness in the Z axis direction of 220 nm, and the upper cladding region 83A to be formed of silicon nitride (SiN) to a thickness in the Z axis direction of 2 μm.

As illustrated in FIG. 12, for example, when light of fundamental mode TE polarized waves (TE0) is input to the output port 67, for example, the effective refractive index of the fundamental mode TE polarized waves gradually changes from the value at the right side of the curve C3 to the value at the left side, because the width of the output port 67 gradually decreases as the output port 67 is further away from the multimode interference optical waveguide 65. Also, when light of fundamental mode TM polarized waves (TM0) is input to the output port 67, for example, the effective refractive index of the fundamental mode TM polarized waves gradually changes from the value at the right side of the curve C2 to the value at the left side, because the width of the output port 67 gradually decreases as the output port 67 is further away from the multimode interference optical waveguide 65, and also the propagation mode changes from fundamental mode TM polarization waves which is the eigenmode at the right side on the curve C2 to first-order mode TE polarization waves which is the eigenmode at the left side on the curve C2.

Also, when light of first-order mode TE polarized waves (TE1) is input to the output port 67, for example, the effective refractive index of the first-order mode TE polarized waves gradually changes from the value at the right side of the curve C1 to the value at the left side, because the width of the output port 67 gradually decreases as the output port 67 is further away from the multimode interference optical waveguide 65, and also the propagation mode changes from first-order mode TE polarization waves which is the eigenmode at the right side on the curve C1 to fundamental mode TM polarization waves which is the eigenmode at the left side on the curve C1.

Accordingly, when inputting the first-order mode sixth TE polarized wave component TEy to the output port 67 (see FIG. 8), the plane of polarization is rotated by a predetermined angle (90 degrees with the present embodiment) and the mode is converted to the fundamental mode (i.e., converted to the seventh TM polarized wave component TMy), as indicated by curve C1 in FIG. 12, for example. Also, when inputting the fundamental mode fifth TE polarized wave component TEx to the output port 67 (see FIG. 8), the polarization state is maintained (TE polarization state is maintained) in the fundamental mode while being guided through the taper-shaped core region 67A of the output port 67 as indicated by curve C3 in FIG. 12, for example.

Figure 13A:
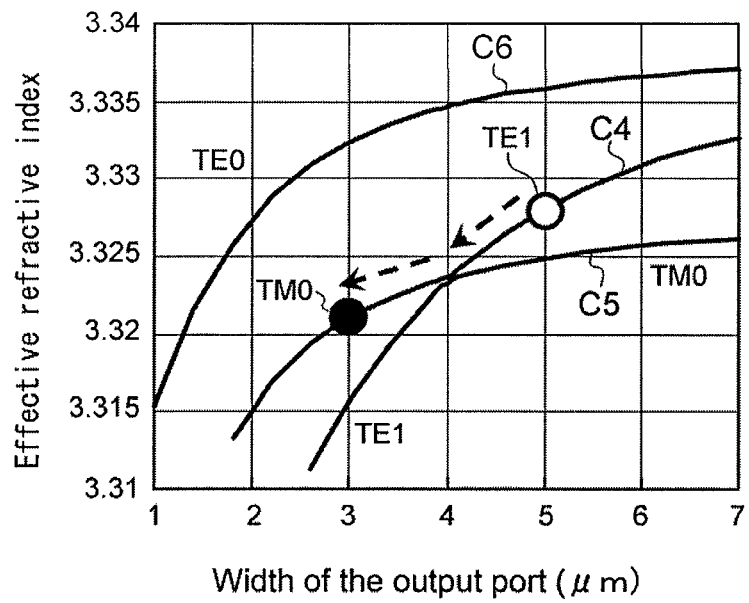
FIGS. 13A and 13B are diagrams illustrating, regarding light of each intrinsic mode guided through an output port, calculation results of the relation between the width of the output port and the effective refractive index.
Figure 13B:
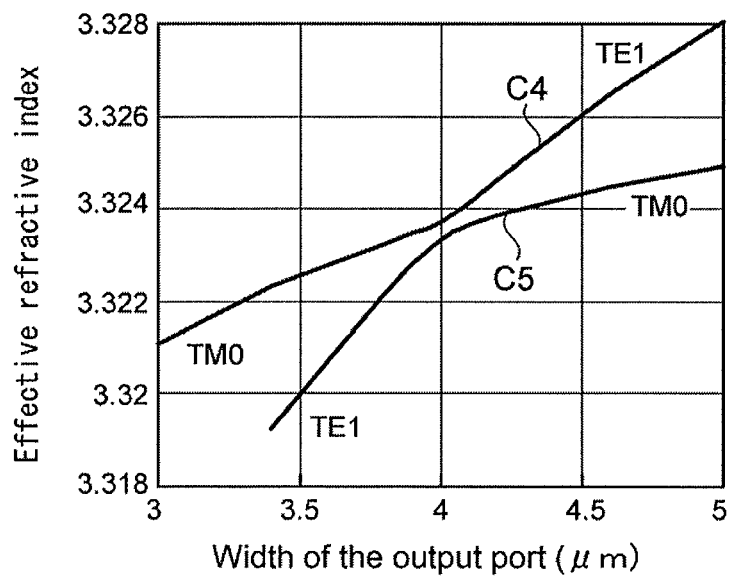

FIG. 13A is a diagram illustrating the result of calculating the relationship between the width of the output port 67 and the effective refractive index for each eigenmode guided through the output port 67 having the cross-sectional structure such as illustrated in FIG. 10C. FIG. 13B is a partial enlargement of FIG. 13A. The horizontal axes in FIGS. 13A and 13B represent the width of the output port 67 in the Y axis direction (the width in the Y axis direction of the region stipulating the optical waveguide and optical waveguide direction of the output port 67). The vertical axes represent the effective refractive index for each eigenmode (fundamental mode TE polarized waves (TE0), fundamental mode TM polarized waves (TM0), first-order mode TE polarized waves (TE1)). Calculation is made here assuming the substrate 81 to be formed of InP, the core region 82B to be formed of GaInAsP to a thickness in the Z axis direction of 500 nm, the output port 67 to be formed of InP to a thickness in the Z axis direction of 950 nm, and the protective film 83B to be formed of silicon oxide ($SiO_2$) to a thickness in the Z axis direction of 50 nm.

As illustrated in FIGS. 13A and 13B, for example, when light of fundamental mode TE polarized waves (TE0) is input to the output port 67, for example, the effective refractive index of the fundamental mode TE polarized waves gradually changes from the value at the right side of the curve C6 to the value at the left side, because the width of the output port 67 gradually decreases as the output port 67 is further away from the multimode interference optical waveguide 65. Also, when light of fundamental mode TM polarized waves (TM0) is input to the output port 67, for example, the effective refractive index of the fundamental mode TM polarized waves gradually changes from the value at the right side of the curve C5 to the value at the left side, because the width of the output port 67 gradually decreases as the output port 67 is further away from the multimode interference optical waveguide 65, and also the propagation mode changes from fundamental mode TM polarization waves which is the eigenmode at the right side on the curve C5 to first-order mode TE polarization waves which is the eigenmode at the left side on the curve C5.

Also, when light of first-order mode TE polarized waves (TE1) is input to the output port 67, for example, the effective refractive index of the first-order mode TE polarized waves gradually changes from the value at the right side of the curve C4 to the value at the left side, because the width of the output port 67 gradually decreases as the output port 67 is further away from the multimode interference optical waveguide 65, and also the propagation mode changes from first-order mode TE polarization waves which is the eigenmode at the right side on the curve C4 to fundamental mode TM polarization waves which is the eigenmode at the left side on the curve C4.

Accordingly, when inputting the first-order mode sixth TE polarized wave component TEy to the output port 67 (see FIG. 8), as described above, the polarization plane is rotated by a predetermined angle (90 degrees with the present embodiment) and the propagation mode is converted to the fundamental mode (i.e., converted to the seventh TM polarized wave component TMy), as indicated by curve C4 in FIGS. 13A and 13B, for example. Also, when inputting the fundamental mode fifth TE polarized wave component TEx to the output port 67 (see FIG. 8), as described above, the polarization state is maintained (TE polarization state is maintained) in the fundamental mode while being guided through the taper-shaped core region 67A of the output port 67 as indicated by curve C6 in FIG. 12, for example.

As described above, when the sixth TE polarized wave component TEy input to the output port 67 is guided through the output port 67, the polarization plane is rotated by a predetermined angle (90 degrees with the present embodiment) and the propagation mode is converted to the fundamental mode (i.e., converted to the seventh TM polarized wave component TMy). In this case, the output port 67 is preferably formed such that degeneracy of the propagation mode of the sixth TE polarized wave component TEy does not occur (i.e., so that the curve C1 and curve C2 in FIG. 12 do not intersect within the range of change of width of the output port 67 (or curve C4 and curve C5 in FIGS. 13A and 13B do not intersect)).

Accordingly, conversion efficiency to the fundamental mode at the time of guiding the sixth TE polarized wave component TEy through the output port 67 (i.e., conversion efficiency to the seventh TM polarized wave component TMy) can be improved. Note that preventing the curve C1 and curve C2 in FIG. 12 from intersecting within the range of change of width of the output port 67 (or preventing the curve C4 and curve C5 in FIGS. 13A and 13B from intersecting) can be realized by configuring the lower cladding region 82A and upper cladding region 83A of materials with different refractive indices (or configuring the core region 82B and protective film 83B of materials with different refractive indices) or the like, so that the refractive index distribution in the thickness direction (Z axis direction) of the output port 67 is asymmetrical.

With the DP QPSK optical modulator LM according to the present embodiment as described above, the multimode interference coupler 60 can perform the three optical operations of optical coupling (multiplexing) of the first TE polarized wave component Iy and fourth TE polarized wave component Qy, polarization coupling (multiplexing) of the fifth TE polarized wave component TEx and sixth TE polarized wave component TEy, and polarization rotating of the sixth TE polarized wave component TEy (see FIG. 8).

Accordingly, the four optical operations to obtain DP QPSK signal light MS, which are optical coupling (multiplexing) of the second TE polarized wave component Ix and third TE polarized wave component Qx, optical coupling (multiplexing) of the first TE polarized wave component Iy and fourth TE polarized wave component Qy, polarization rotating of the sixth TE polarized wave component TEy (conversion of the sixth TE polarized wave component TEy to the seventh TM polarized wave component TMy), and polarization coupling (multiplexing) of the fifth TE polarized wave component TEx and sixth TE polarized wave component TEy, can be realized with two optical elements (the optical multiplexer 57 and multimode interference coupler 60) which is less than with conventional DP QPSK optical modulators (see FIGS. 7 and 8). Accordingly, the number of optical elements where optical loss might occur can be reduced. Consequently, optical loss in the DP QPSK optical modulator LM can be reduced.

Reduction in size of elements has been difficult with conventional DP QPSK optical modulators LMP (see FIG. 1). On the other hand, with the DP QPSK optical modulator LM according to the present embodiment, reduction in size of elements can be facilitated while having functions equivalent to those of conventional DP QPSK optical modulators. For example, conventional DP QPSK optical modulators LMP have a length of around 2.3 mm in the X axis direction. On the other hand, the DP QPSK optical modulator LM having a length of around 1.95 mm in the X axis direction can be realized.

Further, with the DP QPSK optical modulator LM according to the present embodiment, as viewed from the Z axis direction as a first direction, the multimode interference optical waveguide 65 has a first outer edge 65S1 having a straight line form in contact with the first input port 61, the second input port 62, and the third input port 63, a second outer edge 65S2 facing the first outer edge 65S1 and in contact with the output port 67, and a third outer edge 65S3 and a fourth outer edge 65S4 in contact with the first outer edge 65S1 and second outer edge 65S2. Further, as viewed from the first direction, the first input port 61 is connected to one end of the first outer edge 65S1 such that the outer edge 61S of the first input port 61 is steplessly connected to the third outer edge 65S3 of the multimode interference optical waveguide 65. Also, as viewed from the first direction, the third input port 63 is connected to one end of the first outer edge 65S1 such that the outer edge 63S of the third input port 63 is steplessly connected to the fourth outer edge 65S4 of the multimode interference optical waveguide 65 (see FIG. 8).

Accordingly, the first input port 61 and third input port 63 are in direct contact with the multimode interference optical waveguide 65, so an optical loss at the interface thereof can be reduced. Further, when the first TE polarized wave component Iy and the fourth TE polarized wave component Qy are optically coupled and converted to first-order mode as a sixth polarized wave component TEy within the multimode interference optical waveguide 65, the number of points at which the first-order mode sixth polarized wave component TEy is imaged within the multimode interference waveguide 65 is reduced. Accordingly, the optical coupling efficiency of the first TE polarized wave component Iy and the fourth TE polarized wave component Qy and conversion efficiency to first-order mode can be improved (see FIG. 8). As a result, optical loss in the DP QPSK optical modulator LM can be further reduced.

Further, with the DP QPSK optical modulator LM according to the present embodiment, the first input port 61 is configured of a single-mode optical waveguide. The first-order mode first TE polarized wave component Iy cannot propagate through the first input port 61. Accordingly, the first-order mode first TE polarized wave component Iy can be cut off. In the same way, the third input port 63 is configured of a single-mode optical waveguide. The first-order mode fourth TE polarized wave component Qy cannot propagate through the third input port 63. Accordingly, the first-order mode fourth TE polarized wave component Qy can be cut off (see FIG. 8). Accordingly, an arrangement can be realized where just the fundamental mode first TE polarized wave component Iy is guided to the first input port 61. Also, an arrangement can be realized where just the fundamental mode fourth TE polarized wave component Qy is guided to the third input port 63. Accordingly, the coupling efficiency of the first TE polarized wave component Iy and the fourth TE polarized wave component Qy and conversion efficiency to first-order mode in the multimode interference optical waveguide 65 can be improved. As a result, optical loss in the DP QPSK optical modulator LM can be further reduced. In order to obtain a first input port 61 and third input port 63 satisfying such conditions, the width of the first input port 61 and third input port 63 in the Y axis direction is formed at a predetermined size or smaller as viewed from the first direction, for example (see FIG. 8).

Further, with the DP QPSK optical modulator LM according to the present embodiment, the phase of the third TE polarized wave component Qx is changed by $\pi/2$ by the first phase-change unit 55. Also, the phase of the fourth TE polarized wave component Qy is changed by $\pi/2$ by the second phase-change unit 56 (see FIG. 7). Accordingly, the phase of the second TE polarized wave component Ix immediately before input to the optical multiplexer 57, and the phase of the third TE polarized wave component Qx immediately before input to the optical multiplexer 57, can be made to be generally orthogonal. Also, the phase of the first TE polarized wave component Iy immediately before input to the first input port 61, and the phase of the fourth TE polarized wave component Qy immediately before input to the third input port 63, can be made to be generally orthogonal. This enables generating of DP QPSK signal light MS which is robust with regard to noise.

The present invention is not restricted to the above embodiments, and various modifications can be made. For example, with the present embodiment described above, as viewed from the first direction, the first input port 61 is connected to one end of the first outer edge 65S1 such that the outer edge 61S of the first input port 61 is steplessly connected to the third outer edge 65S3 of the multimode interference optical waveguide 65 (see FIG. 8). However, the outer edge 61S of the first input port 61 may be connected to the first outer edge 65S1 with a step formed as to the third outer edge 65S3 of the multimode interference optical waveguide 65 as viewed from the first direction. In the same way, with the present embodiment described above, as viewed from the first direction, the third input port 63 is connected to one end of the first outer edge 65S1 such that the outer edge 63S of the third input port 63 is steplessly connected to the fourth outer edge 65S4 of the multimode interference optical waveguide 65 (see FIG. 8). However, the outer edge 63S of the third input port 63 may be connected to the first outer edge 65S1 with a step formed as to the fourth outer edge 65S4 of the multimode interference optical waveguide 65 as viewed from the first direction.

Also, with the embodiment described above, the multimode interference optical waveguide 65 of the multimode interference coupler 60 has a generally rectangular form as viewed from the first direction (see FIG. 8), but is not restricted to this form, and may be, for example, a trapezoid, an hourglass shape, or barrel shape, for example.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of claims are claimed as the present invention.

What is claimed is:

1. A dual polarization quadrature phase shift keying (DP QPSK) optical modulator, comprising:
    an input port;
    an optical branching unit branching linearly-polarized light received from the input port into first through fourth linearly-polarized light components;
    an optical modulation unit connected to the optical branching unit, the optical modulation unit having first through fourth Mach-Zehnder interferometers that modulate the first through fourth linearly-polarized light components;
    a first phase-change unit connected to the third Mach-Zehnder interferometer, the first phase-change unit changing a phase of the third linearly-polarized light component;
    a second phase-change unit connected to the fourth Mach-Zehnder interferometer, the second phase-change unit changing a phase of the fourth linearly-polarized light component;
    an optical multiplexer coupling the second linearly-polarized light component and third linearly-polarized light component; and
    a multimode interference coupler including a multimode interference waveguide, first through third input ports extending in an optical waveguide direction, and an output port having a taper-shaped waveguide, the first through third input ports being provided along a direction orthogonal to the optical waveguide direction, the second input port being provided between the first input port and the third input port,
    wherein the first Mach-Zehnder interferometer is connected to the first input port of the multimode interference coupler,
    one end of the optical multiplexer is connected to the second Mach-Zehnder interferometer and the third Mach-Zehnder interferometer via the first phase change unit,
    the other end of the optical multiplexer is connected to the second input port of the multimode interference coupler, and
    the fourth Mach-Zehnder interferometer is connected to the third input port of the multimode interference coupler via the second phase-change unit.

2. The DP QPSK optical modulator according to claim 1, wherein the taper-shaped waveguide of the output port has a width that gradually decreases along the optical waveguide direction in a direction away from the multimode interference waveguide.

3. The DP QPSK optical modulator according to claim 1, wherein the multimode interference waveguide includes a linear first outer edge in contact with the first through third input ports, a second outer edge facing the first outer edge and in contact with the output port, and third and fourth outer edges in contact with the first outer edge and the second outer edge,
    the first input port is connected to one edge of the first outer edge of the multimode interference waveguide, the first input port having an outer edge steplessly connected to the third outer edge of the multimode interference waveguide, and
    the third input port is connected to the other edge of the first outer edge of the multimode interference waveguide, the third input port having an outer edge steplessly connected to the fourth outer edge of the multimode interference waveguide.

4. The DP QPSK optical modulator according to claim 1, wherein the first phase change unit changes the phase of the third linearly-polarized wave component by approximately $\pi/2$, and
    the second phase change unit changes the phase of the fourth linearly-polarized wave component by approximately $\pi/2$.

5. The DP QPSK optical modulator according to claim 1, wherein the optical multiplexer coupling the second linearly-polarized wave component and the third linearly-polarized wave component outputs a fifth linearly-polarized wave component to the second input port,
    the multimode interference coupler couples the first linearly-polarized wave component input to the first input port, the fifth linearly-polarized wave component input to the second input port, and the fourth linearly-polarized wave component input to the third input port within the multimode interference waveguide and outputs a coupled linearly-polarized light to the output port, the first linearly-polarized wave component and the fourth linearly-polarized wave component being converted to first-order mode and output to the output port as a sixth linearly-polarized wave component.

6. The DP QPSK optical modulator according to claim 5, wherein the multimode interference waveguide of the multimode interference coupler is a polarization maintaining waveguide in which polarization states of the first, fourth, and fifth linearly-polarized wave components are maintained.

7. The DP QPSK optical modulator according to claim 5, wherein the output port of the multimode interference coupler converts a propagation mode of the sixth linearly-polarized wave component from the first-order mode to a fundamental mode and rotates a plane of polarization of the sixth linearly-polarized wave component.

8. The DP QPSK optical modulator according to claim 7, wherein the output port is configured such that degeneration of the sixth linearly-polarized wave component does not occur in converting from the first-order mode to the fundamental mode and rotating the plane of polarization of the sixth linearly-polarized wave component.

9. The DP QPSK optical modulator according to claim 1,
wherein the first input port and the third input port are a single-mode optical waveguide,
the first input port cuts off the first linearly-polarized wave component of the first-order mode, and
the third input port cuts off the fourth linearly-polarized wave component of the first-order mode.

* * * * *